United States Patent
Stern-Berkowitz et al.

(10) Patent No.: US 9,585,101 B2
(45) Date of Patent: Feb. 28, 2017

(54) METHODS, APPARATUS AND SYSTEMS FOR POWER CONTROL AND TIMING ADVANCE

(75) Inventors: Janet A. Stern-Berkowitz, Little Neck, NY (US); John W. Haim, Baldwin, NY (US); Stephen E. Terry, Northport, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 294 days.

(21) Appl. No.: 13/572,571

(22) Filed: Aug. 10, 2012

(65) Prior Publication Data

US 2013/0176953 A1 Jul. 11, 2013

Related U.S. Application Data

(60) Provisional application No. 61/522,834, filed on Aug. 12, 2011.

(51) Int. Cl.
| | |
|---|---|
| *H04W 52/40* | (2009.01) |
| *H04W 52/14* | (2009.01) |
| *H04W 52/36* | (2009.01) |
| *H04W 52/24* | (2009.01) |

(Continued)

(52) U.S. Cl.
CPC ....... *H04W 52/146* (2013.01); *H04W 52/248* (2013.01); *H04W 52/365* (2013.01); *H04W 52/08* (2013.01); *H04W 52/34* (2013.01); *H04W 52/367* (2013.01); *H04W 52/40* (2013.01)

(58) Field of Classification Search
None
See application file for complete search history.

(56) References Cited

U.S. PATENT DOCUMENTS

| | | |
|---|---|---|
| 2006/0286996 A1 | 12/2006 | Julian et al. |
| 2010/0137017 A1 | 6/2010 | Lin et al. |
| 2010/0272091 A1 | 10/2010 | Fabien et al. |

(Continued)

FOREIGN PATENT DOCUMENTS

| | | |
|---|---|---|
| EP | 2317815 A1 | 5/2011 |
| EP | 2343946 A2 | 7/2011 |

(Continued)

OTHER PUBLICATIONS

3rd Generation Partnership Project (3GPP), R1-100216 "Basic UL Power Control Methods in LTE-Advanced", LG Electronics, 3GPP TSG RAN WG1 #59bis, Valencia, Spain, Jan. 18-22, 2010, 1-5.

(Continued)

*Primary Examiner* — Sulaiman Nooristany
(74) *Attorney, Agent, or Firm* — Condo Roccia Koptiw LLP

(57) ABSTRACT

A wireless transmit/receive unit (WTRU) may establish communication with a first set of cells and a second set of cells. The first set of cells may be associated with a first scheduler and the second set of cells may be associated with a second scheduler. The maximum allowed transmit power for the WTRU may be determined for and/or distributed across the first set of cells and the second set of cells. The first scheduler may determine a first maximum power value for the first set of cells and a second maximum power value for the second set of cells configured. The first scheduler may signal the second maximum power value to the second scheduler.

17 Claims, 17 Drawing Sheets

(51) Int. Cl.
*H04W 52/08* (2009.01)
*H04W 52/34* (2009.01)

(56) References Cited

U.S. PATENT DOCUMENTS

| | | | |
|---|---|---|---|
| 2010/0273515 A1* | 10/2010 | Fabien et al. | 455/509 |
| 2010/0331037 A1 | 12/2010 | Jen | |
| 2011/0038271 A1 | 2/2011 | Shin et al. | |
| 2011/0134774 A1 | 6/2011 | Pelletier et al. | |
| 2011/0299407 A1 | 12/2011 | Saito et al. | |
| 2012/0064936 A1* | 3/2012 | Vrzic | H04W 52/243 455/522 |
| 2012/0082041 A1* | 4/2012 | Damnjanovic et al. | 370/252 |
| 2012/0106490 A1 | 5/2012 | Nakashima et al. | |
| 2012/0113848 A1* | 5/2012 | Kim | H04W 52/365 370/252 |
| 2012/0196645 A1* | 8/2012 | Kim | H04W 52/36 455/524 |
| 2012/0287886 A1 | 11/2012 | Fukuoka et al. | |

FOREIGN PATENT DOCUMENTS

| | | |
|---|---|---|
| EP | 2742749 A2 | 6/2014 |
| JP | 2011508467 A | 3/2011 |
| JP | 2012522473 A | 9/2012 |
| JP | 2013511916 A | 4/2013 |
| WO | WO 2009060303 A2 | 5/2009 |
| WO | WO 2010095429 A1 | 8/2010 |
| WO | WO 2010121708 A1 | 10/2010 |
| WO | WO 2010131708 A1 | 10/2010 |
| WO | WO 2010129146 A2 | 11/2010 |
| WO | WO 2010146938 A1 | 12/2010 |
| WO | WO 2011041700 A1 | 4/2011 |
| WO | WO 2011050921 A1 | 5/2011 |
| WO | WO 2011063244 A2 | 5/2011 |
| WO | WO 2011/100492 A1 | 8/2011 |
| WO | WO 2011/100673 A1 | 8/2011 |
| WO | WO 2011093096 A1 | 8/2011 |

OTHER PUBLICATIONS

3rd Generation Partnership Project (3GPP), TS 36.213 V10.2.0, Technical Specification Group Radio Access Network, Evolved Universal Terrestrial Radio Access (E-UTRA), Physical layer procedures (Release10), Jun. 2011, 1-120.

Jungnickel et al., "Synchronization of Cooperative Base Stations", Wireless Communication Systems, ISWCS '08, IEEE International Symposium on, IEEE, Oct. 21-24, 2008, 329-334.

3rd Generation Partnership Project (3GPP), R1-111783, "Including $P_{cmax}$ in Power Headroom Reporting", MediaTek, Inc., 3GPP TSG-RAN WG1, Meeting #65, Barcelona, Spain, May 9-13, 2011, 4 pages.

3rd Generation Partnership Project (3GPP), TS 36.101, V10.3.0, "3rd Generation Partnership Project; Technical Specification Group Radio Access Network; Evolved Universal Terrestrial Radio Access (E-UTRA); User Equipment (UE) radio transmission and reception (Release 10)", Jun. 2011, 237 pages.

3rd Generation Partnership Project (3GPP), TS 36.321, V10.2.0, "3rd Generation Partnership Project; Technical Specification Group Radio Access Network; Evolved Universal Terrestrial Radio Access (E-UTRA); Medium Access Control (MAC) protocol specification (Release 10)", Jun. 2011, 54 pages.

3rd Generation Partnership Project (3GPP), TS 36.331, V10.2.0, 3rd Generation Partnership Project; Technical Specification Group Radio Access Network; Evolved Universal Terrestrial Radio Access (E-UTRA); Radio Resource Control (RRC); Protocol specification (Release 10), Jun. 2011, 294 pages.

* cited by examiner

| sf | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|
| g(k) | G | G | G | NA | NA | G | G | NA | G+3 | G+3 | NA | NA | G+3 | G+3 | NA | NA | G+3 | G+3 | G+2 |
| xmit | Y | Y | Y | N | N | Y | Y | N | Y | Y | N | N | Y | Y | N | N | Y | Y | Y |
| TPC | 0 | 0 | 0 | 0 | +3 | 0 | 0 | 0 | 0 | 0 | 0 | 0 | 0 | 0 | -1 | 0 | 0 | 0 | 0 |
| des. | | | | | | | | | G+3 | G+3 | G+3 | G+3 | G+3 | G+3 | G+3 | G+3 | G+3 | G+3 | G+2 |

— 300

FIG. 3 sf = subframe = k
g(k) = TPC factor in subframe k
xmit: Y= transmitted to (intended for) this eNB
TPC = TPC command
des. = eNB's desired TPC factor value

| sf | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|
| g(k) | G | G+2 | G+2 | G+2 | G+2 | G+2 | G+2 | G+2 | G+3 | G+4 | G+4 | G+4 | G+3 | G+3 | G+4 | G+4 | G+4 | G+4 | G+4 |
| xmit | 1 | 1,2 | 1,2 | 1 | 1 | 1,2 | 1 | 1 | 1 | 1,2 | 1,2 | 1,2 | 1 | 1 | 1,2 | 1,2 | 1,2 | 1,2 | 1,2 |
| TPC 1 | 0 | 0 | 0 | 0 | +3 | 0 | 0 | 0 | 0 | 0 | 0 | 0 | 0 | -1 | 0 | 0 | 0 | 0 | 0 |
| TPC 2 | 0 | 0 | 0 | 0 | 0 | +2 | 0 | 0 | 0 | 0 | 0 | 0 | 0 | 0 | 0 | 0 | 0 | 0 | 0 |
| des. 1 | | | | | | | | | G+3 | G+3 | G+3 | G+3 | G+3 | G+3 | G+3 | G+3 | G+3 | G+3 | G+3 |
| des. 2 | | | | | | | | | | G+4 | G+4 | G+4 | G+4 | G+4 | G+4 | G+4 | G+4 | G+4 | G+4 | sf = subframe = k
g(k) = TPC factor in subframe k
xmit: 1 indicates transmission where only eNB1 may receive it;
1,2 indicates transmission where both eNB1 and eNB2 may receive it
TPC x = TPC command from eNBx
des. x = desired TPC factor value for eNBx

FIG. 4

METHODS, APPARATUS AND SYSTEMS FOR POWER CONTROL AND TIMING ADVANCE

CROSS-REFERENCE TO RELATED APPLICATIONS

This application claims the benefit of U.S. Provisional Patent Application No. 61/522,834 filed Aug. 12, 2011, the content of which is hereby incorporated by reference in its entirety.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division-multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology.

Uplink transmitter power control in a mobile communication system balances the need for sufficient energy transmitted per bit to achieve a desired quality-of-service (e.g., data rate and error rate), against the need to minimize interference to other users of the system and to maximize the battery life of the mobile terminal. To accomplish this goal, uplink power control has to adapt to the characteristics of the radio propagation channel, including path loss, shadowing, fast fading and interference from other users in the same cell and adjacent cells.

SUMMARY

A wireless transmit/receive unit (WTRU) may establish communication with a first set of cells and a second set of cells. The first set of cells may be associated with a first scheduler and the second set of cells may be associated with a second scheduler. The maximum allowed transmit power for the WTRU may be determined for and/or distributed across the first set of cells and the second set of cells.

The first scheduler may determine a first maximum power value for the first set of cells and a second maximum power value for the second set of cells configured. The first scheduler may signal the second maximum power value to the second scheduler.

The first and second maximum power values may be signaled to the WTRU. The WTRU may calculate transmit power for the first set of cells, and if the calculated transmit power exceeds the first maximum power value, the WTRU may adjust the transmit power to not exceed the first maximum power value. Similarly, the WTRU may calculate transmit power for the second set of cells, and if the calculated transmit power exceeds the second maximum power value, the WTRU adjusts the transmit power to not exceed the second maximum power value.

The WTRU may manage different power headroom processes for each set of cells, for example a first power headroom process for the first set of cells and a second power headroom process for the second set of cells, where the first power headroom process is different than the second power headroom process.

Each power headroom process may include a respective triggering procedure and reporting procedure. The reporting procedure of the first power headroom process may be based on the triggering procedure of the second power headroom process. The reporting for the first power headroom process may include scheduling information for the second set of cells. Similarly, the reporting for the second power headroom process may include scheduling information for the first set of cells. The reporting may include power headroom information for both the first set of cells and the second set of cells even when the reporting is based on a trigger associated with the first set of cells.

BRIEF DESCRIPTION OF THE DRAWINGS

A more detailed understanding may be had from the following description, given by way of example in conjunction with the accompanying drawings wherein:

FIGS. 3-4 provide tables of example sequences of Transmit Power Control (TPC) commands from a number of eNBs and the effect on transmit power in a sequence of subframes;

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
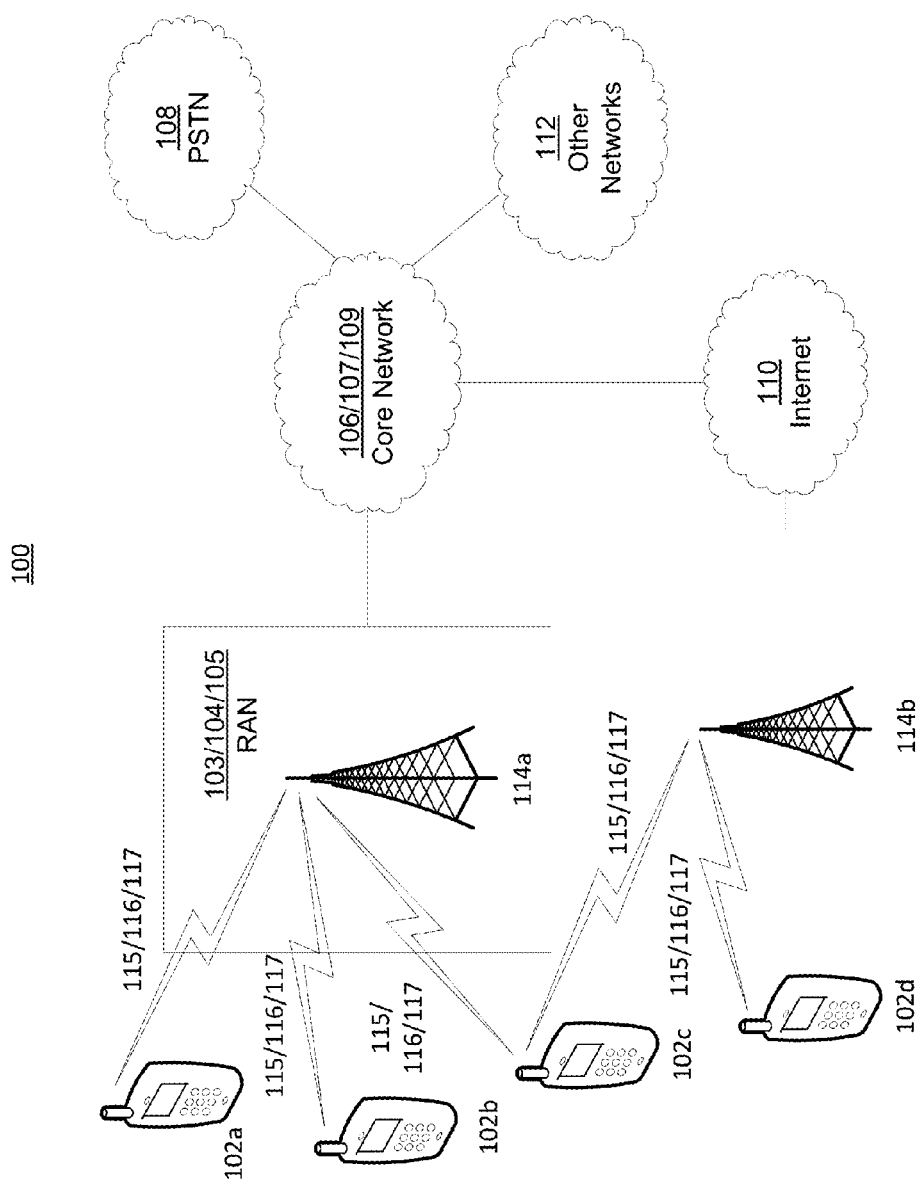
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell. In some embodiments, the transmission point for a cell may not be physically located at the base station 114a, and the base station 114a may transmit and/or receive wireless signals in multiple geographic regions, such as when employing remote radio heads. A base station 114a may have more than one cell associated with it.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the Internet protocol (IP) in the TCP/IP Internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
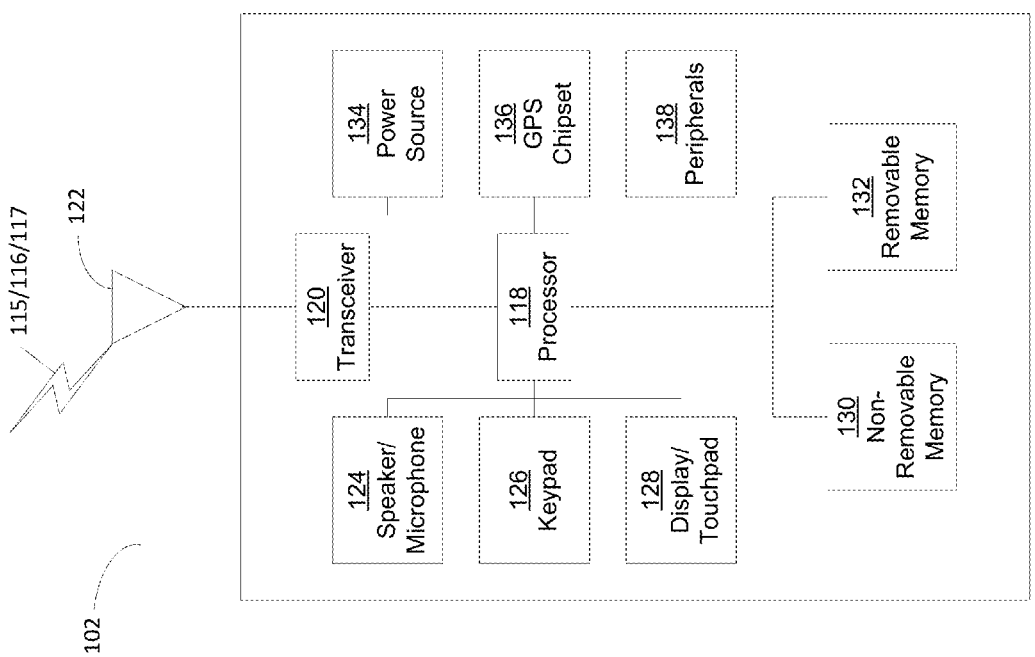
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
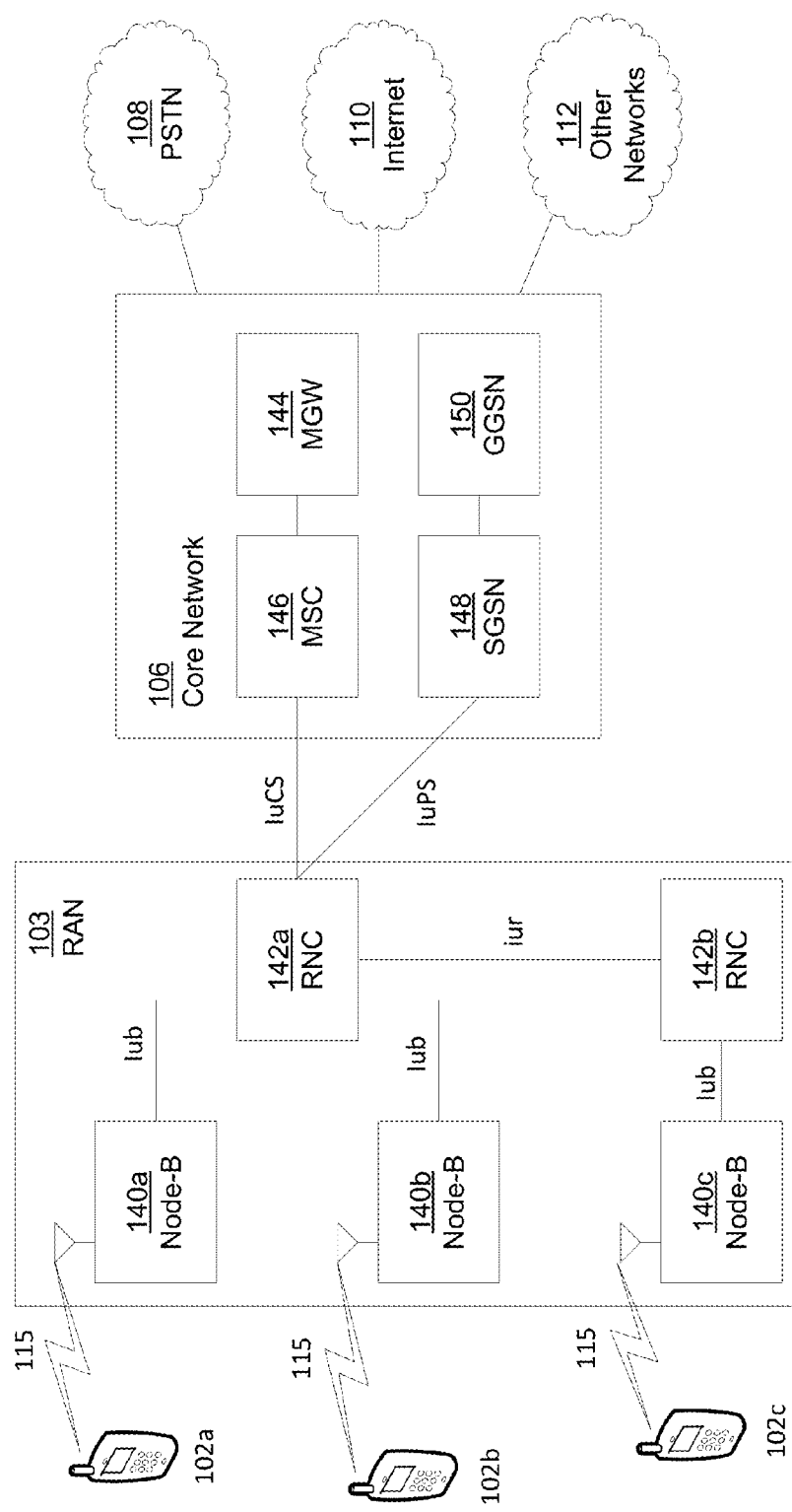
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell or cells (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
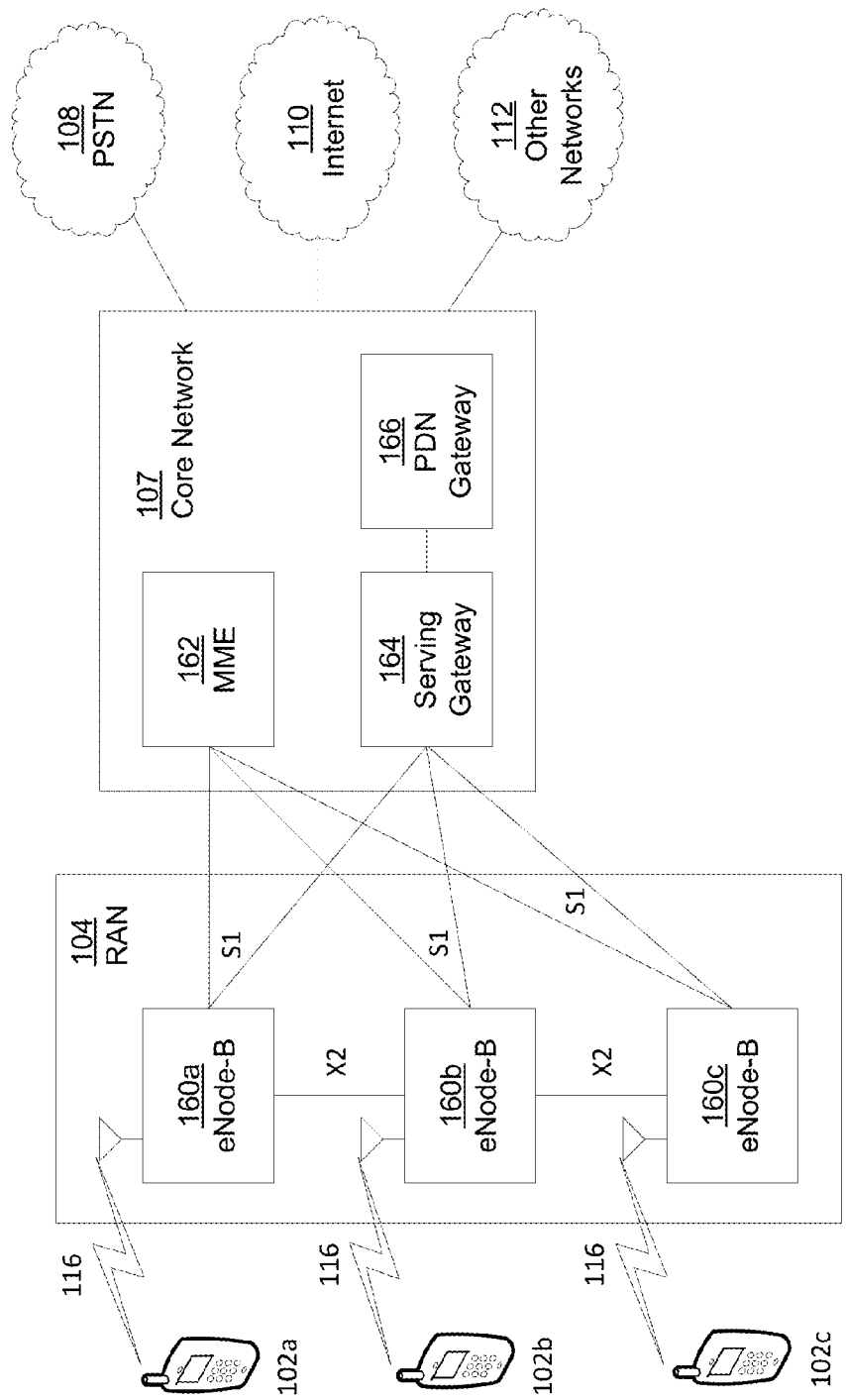
FIG. 1D is a system diagram of an another example radio access network and another example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell or cells (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode-B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
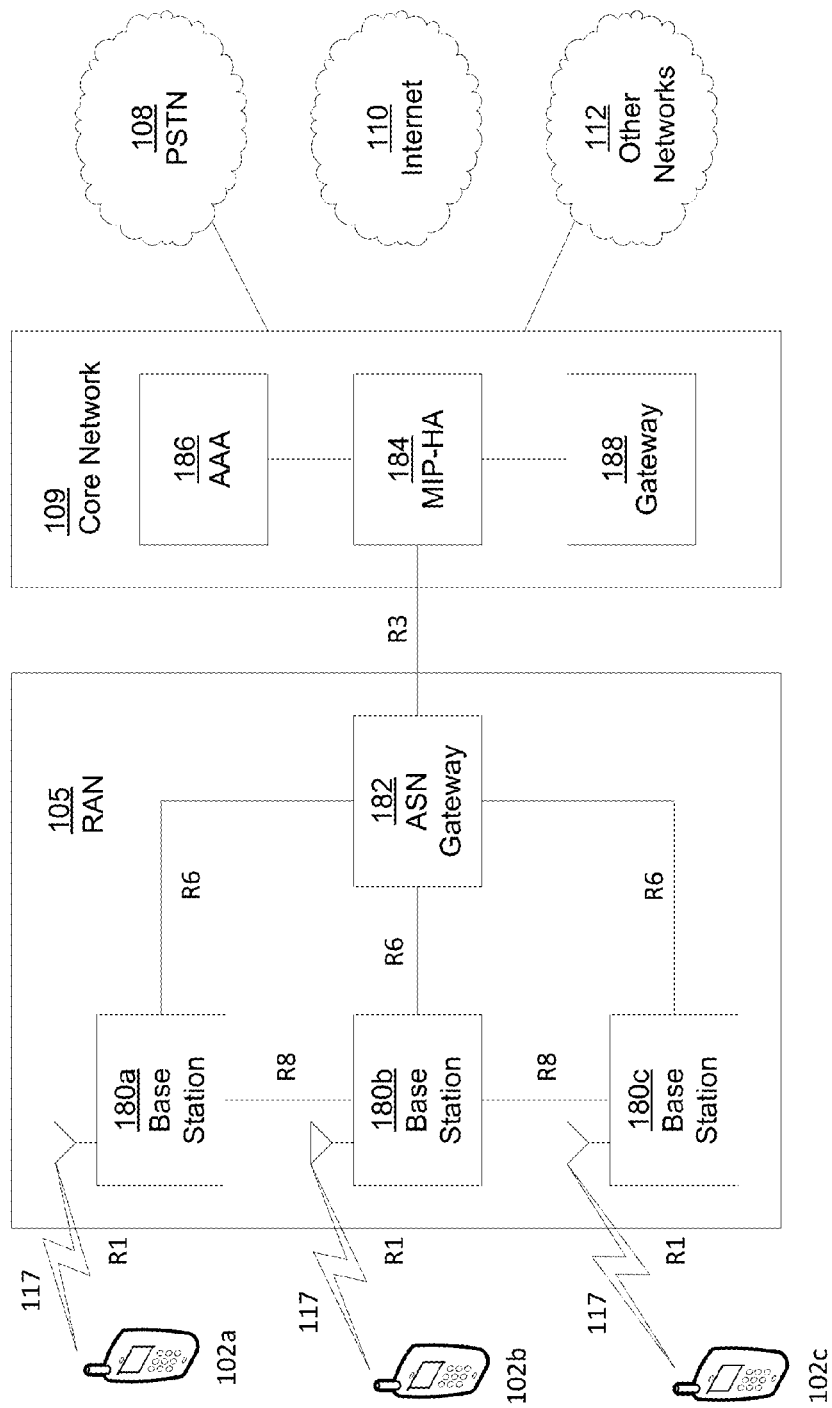
FIG. 1E is a system diagram of an another example radio access network and another example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell or cells (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may be defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Figure 2A:
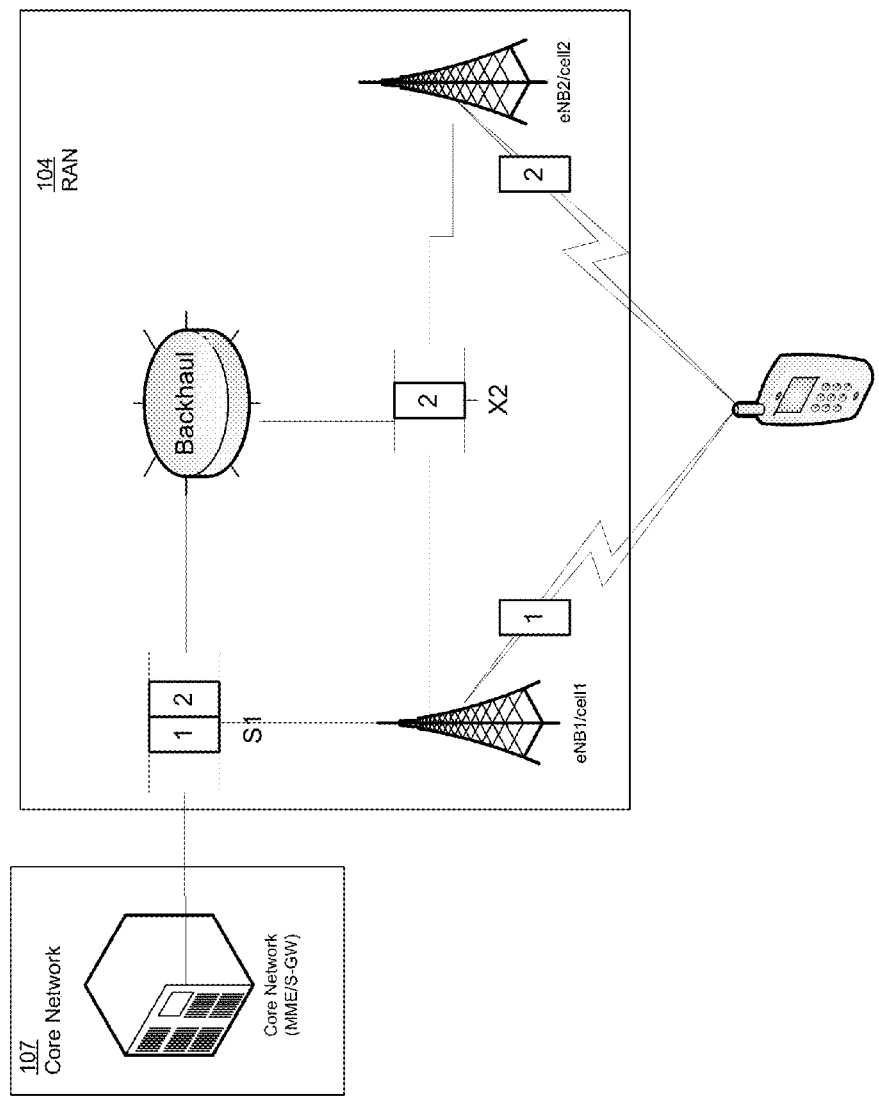
FIG. 2A is a network diagram illustrating downlink data flow splitting in an example multi-scheduler network deployment.

FIG. 2A is a network diagram of the RAN 104 and the core network 107 illustrating downlink data flow splitting in an example multi-scheduler network deployment. Multi-scheduler network deployments may be utilized, for example, in Fuzzy Cell, Cooperative Multipoint (CoMP), Small Cell Hotspot, Dense Cell, and other network deployment scenarios where more than one independent scheduler is utilized to control downlink (DL) and/or uplink (UL) transmissions from a particular WTRU.

Fuzzy Cell is a high performance, low complexity, and robust scheme that may mitigate the cell-edge problem, improve handover performance, and improve overall system performance. A Fuzzy Cell deployment may have non-uniform transmission power and may involve cooperative transmission from multiple sites.

As shown in FIG. 2A, a network may include a deployment in which uplink and downlink data flow between the network and a WTRU may be split such that some of the data may be communicated via one path and other of the data may be communicated via another path or the same data may be communicated via multiple paths. Each path may correspond to at least one of an independent scheduler, eNode-B (eNB), cell, or site. A path between the WTRU and network may be represented and identified by a set of cells, where each cell may provide UL, DL or both UL and DL communication. In this case, each set of cells potentially corresponds to an independent scheduler or eNB.

In an example embodiment, data flow may be split in the downlink (DL), and the split may occur in an eNB. The data intended for a given WTRU may be downloaded from the core network (CN) to a first eNB (eNB1) via an S1 interface. eNB1 may decide to split the data in two parts labeled '1' and '2' in FIG. 2A and referred to herein as "Part 1" and "Part 2," respectively. eNB1 may send Part 1 of the data to the WTRU and may forward Part 2 of the data to a second eNB (eNB2), for example, via an interface, referred to generically as a backhaul interface, such as an X2 or X2-like interface. The second eNB (eNB2) may send Part 2 of the data to the WTRU.

In the case of N secondary eNBs, the data may be split into up to N parts by the first eNB and forwarded, such as by X2 or X2-like interface, to appropriate other eNBs for transmission to the WTRU.

Figure 2B:
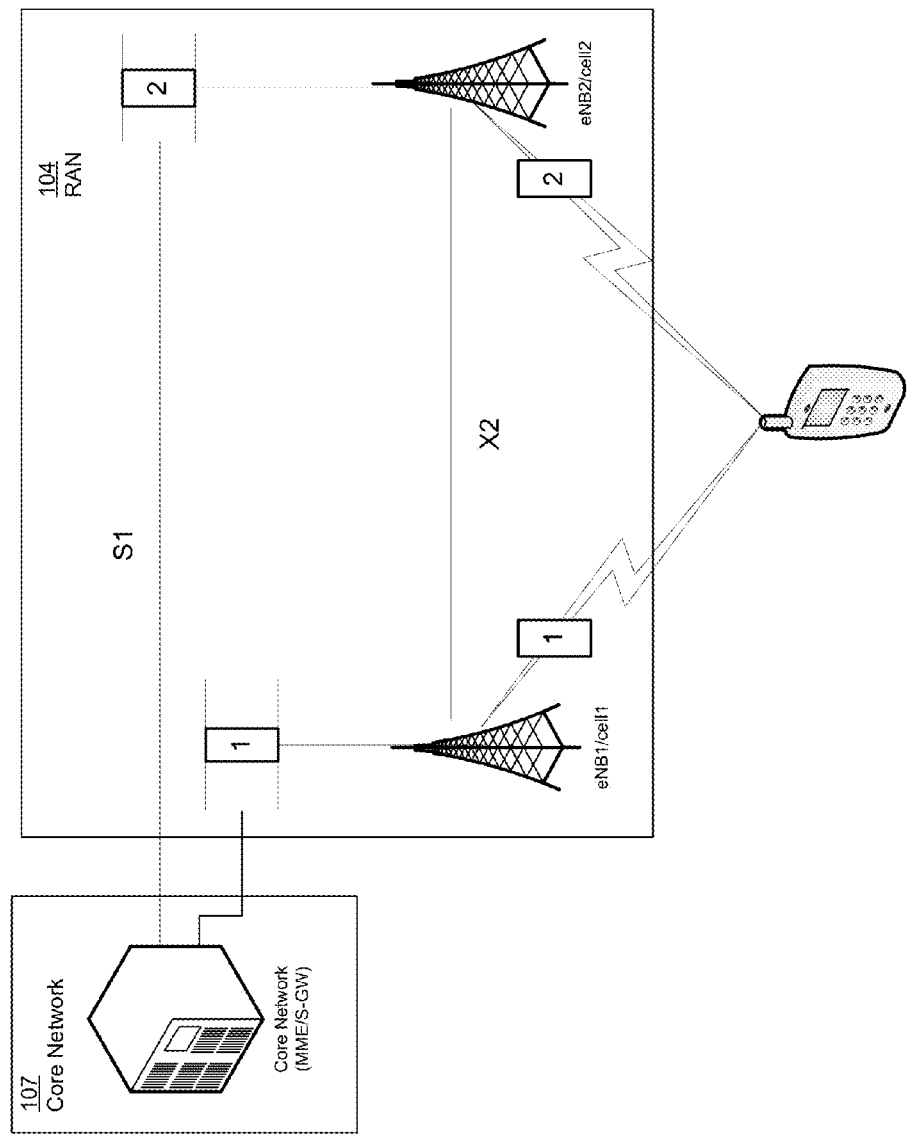
FIG. 2B is a network diagram illustrating downlink data flow splitting in another example multi-scheduler network deployment.

Data may be split at any point in the system and be provided to a plurality of eNBs. For example, data may be split by the CN such that each part may go to an eNB without the need for one eNB to forward the data to another eNB, for example, as shown in FIG. 2B.

Data may be split, for example, by eNB1, according to, for example, quality of service requirement of the transmitted data, volume of transmitted data, resource availability of cells controlled by the eNB, particular data flow, radio bearer, radio bearer type, and/or other criteria.

Additional signaling, such as over the backhaul, may be used to support efficient splitting of the data flow such as by eNB1 as shown, for example, in FIG. 2A. eNB2 may provide information to eNB1 to control the flow of DL data. For example, eNB2 may provide to eNB1 estimates of the data rate or data rates it may support for to certain WTRUs. These estimates may assist eNB1 in making decisions regarding how much data to send to eNB2 for a WTRU for which data may be buffered at eNB1. As another option, eNB2 may employ a flow control or credit mechanism where eNB2 may send signals to eNB1 which may control the rate of transmission from eNB1 in such a way that an amount of DL data is maintained at eNB2 for proper scheduling. eNB2 may inform eNB1 of buffer status reports, e.g., for its DL transmission, which may provide eNB1 with more accurate information about the actual delivery status of transmitted data and/or the data transmission rate of the forwarded data. The actual status of individual transmissions may be known by indication of unique sequence numbers associated with individual data transmissions. Based on this or other feedback from eNB2, eNB1 may decide whether or not to send more data to eNB2 with the goal of maintaining the smallest amount of buffered data in eNB2 that does not impede proper scheduling and maximum throughput from eNB2.

DL data splitting concepts for multiple eNBs, cells, sets of cells, schedulers, sites, among others, may be similarly applied in the UL. For example a WTRU may determine how to split its transmission of UL data based on the at least one eNB, cell, set of cells, site, or scheduler from which it received an UL grant. The WTRU may split data based on at least one of a quality of service (QoS) requirement of the transmitted data, the volume of transmitted data, resource availability of cells controlled by the eNB, the particular data flow, radio bearer, radio bearer type, and/or other means. In the WTRU, this splitting of UL data may be accomplished in the Logical Channel Prioritization procedure. In this case, the Logical Channel Prioritization procedure may treat each eNB, scheduler, cell, set of cells, or site independently, where UL grants associated with one of these entities may be restricted to particular data, such as radio bearers or radio bearer types.

A WTRU data split may be based on configuration. For example, configuration may associate certain data with a particular cell, set of cells, eNB, or site.

A WTRU may be configured such that it is aware of which cells, serving cells, or CCs belong to a certain eNB or scheduler. For example, there may be groups identified such as scheduling groups, where a scheduling group may consist of a set of cells, serving cells, or CCs. A WTRU may be configured such that it is aware of which radio bearers or radio bearer types belong to a certain eNB or scheduler. For example, there may be groups identified such as scheduling groups, where a scheduling group may consist of a set of or certain radio bearers or radio bearer types.

It will be appreciated that, while data flow splitting is disclosed in the non-limiting example operational context of an eNB, the disclosed subject matter is applicable to a variety of independent schedulers that manage one or more cells. Uplink and/or downlink data may be split among multiple eNBs, multiple schedulers, such as independent schedulers, multiple cells, multiple sites, multiple beams, among others and still be consistent with this disclosure. Multiple cells may correspond to an independent scheduler or eNB. Further, schedulers may receive instructions from other schedulers, for example, a master scheduler. A scheduler may or may not be associated with a specific eNB. As a particular example, an eNB may incorporate a single scheduler or multiple schedulers.

eNB as used in this disclosure, may mean, may include, or may be replaced by a scheduler, such as an independent scheduler, or multiple schedulers and still be consistent with this disclosure. A scheduler, e.g., an independent scheduler, may be associated with a certain eNB, cell, set of cells, or set of eNBs, and may manage the resources for that eNB(s) or cell(s). An eNB as used herein, or a site may mean or be replaced by a set of configured cells. Each set of configured cells may be managed by an independent scheduler. A scheduler, such as an independent scheduler may or may not be, or may or may not be part of, an eNB or cell. One or more cells may be associated with a particular scheduler, which may or may not be associated with a particular eNB or particular eNBs.

Further, eNB as used in this disclosure may mean, may include, or may be replaced by a cell, a set of cells, multiple sets of cells, a site, a beam, or a set of beams and still be consistent with this disclosure. For purposes of this disclosure, anywhere the term "eNB" is used, "cell" or "set of cells" may be used in addition or instead. In addition, anywhere the term "cell" or "set of cells" is used, eNB may be used in addition or instead. A cell or set of cells may also mean, include, or be replaced by at least one scheduler or independent scheduler, which may or may not be associated with a particular eNB. Cell, serving cell, and component carrier (CC) may be used interchangeably. Cell set and set of cells may be used interchangeably.

As part of the LTE standard in 3GPP release 10, the WTRU (such as WTRU 102 illustrated in FIG. 1C) may transmit uplink (UL) feedback, also called uplink control information (UCI) in response to DL transmissions, on demand, and periodically. The UCI may include ACK/NACK (A/N) indicating whether the DL transmissions were received successfully, channel quality indicator (CQI), and other indicators such as rank indicator (RI) and scheduling request (SR). The WTRU may transmit the UCI on a physical uplink control channel (PUCCH) or a physical uplink shared channel (PUSCH) or split between PUCCH and PUSCH depending on a set of defined rules. In one approach in a given subframe, there may be at most one PUCCH and it may only be transmitted to the WTRU's primary serving cell, PCell. In this approach, there may be multiple PUSCH, but only one may carry UCI in a given subframe and if there is PUSCH on the PCell, only that PUSCH may carry the UCI.

In Release 8/9 of the LTE standards, power control (PC) and power headroom (PH) were defined for a single serving cell for each of PUCCH and PUSCH. PC may have an open loop component and a closed loop component. The WTRU may use measured path loss and parameters it has or can compute, such as the size of the UL grant, to determine the open loop component, and accumulated or absolute TPC bits as the closed loop component, to determine the transmit power for PUSCH or PUCCH in a subframe. PUSCH power control currently supports both accumulated TPC and absolute TPC; PUCCH power control only supports accumulated TPC. Before finalizing the power to use for transmission, the WTRU may compare its computed power, determined from the open and closed loop components, with its configured maximum output power, Pcmax. The configured maximum output power may be the lesser of signaled maximum power and power class less allowed power reductions. The allowed power reductions may be a function of the UL configuration and the current grant, and they may be used to ensure the WTRU does not violate spectral emissions and other transmit requirements. If the computed power exceeds Pcmax, the transmit power may be set equal to Pcmax, and this may be the power used for transmission. Otherwise, the computed power may be used for the transmit power.

Power headroom (PH) may be the difference between Pcmax and the computed transmit power for the subframe in which the WTRU may send a PH report to the eNB. It may provide the PH for the WTRU's UL grant or allocation (e.g., SPS allocation) for the subframe of the PH report. Positive headroom may indicate the WTRU's ability to handle a larger grant or allocation. Negative headroom may indicate that the WTRU limited the transmit power to the maximum allowed, and may indicate by how much the grant or allocation was too large. PH may be used by the eNB scheduler in its future scheduling decisions. For example, if the headroom is positive, the eNB may schedule a larger grant. If the headroom is negative, the eNB may reduce the size of the grant. PH reports may be configured to be sent to the eNB periodically. They may also be event triggered, such as when path loss changes by more than a threshold.

In Release 10 of the LTE standards, the power control (PC) and power headroom (PH) concepts were extended to simultaneous UL transmission on multiple cells. The power on each serving cell for which there is transmission may first be computed independently of the other serving cells. Each serving cell may have its own configured maximum output power, Pcmax,c. As in Release 8/9, Pcmax,c may include allowed power reductions to meet spurious emissions and other transmit requirements. In Release 10, additional reductions may be allowed for other factors such as power management to meet SAR or other non-LTE specific requirements. Reductions for inter-modulation effects when transmitting inter-band may be allowed in Release 11.

If any serving cell's computed transmit power would exceed its Pcmax,c, its computed transmit power may be set equal to Pcmax,c. For the PCell that may have simultaneous transmission of both PUCCH and PUSCH, the PUCCH power may be computed first and limited by Pcmax,c for the PCell. Then the PUSCH power may be computed for the PCell, where its power may be limited by Pcmax,c for the PCell minus the power allotted to the PUCCH. In addition to the configured maximum output powers for the individual serving cells, there may also be a configured maximum output power, Pcmax, for the WTRU as a whole. If the sum of the individual computed transmit powers would exceed Pcmax, the channel powers may be scaled or limited according to a set of priority rules such that Pcmax is not exceeded. PUCCH may have the highest priority, PUSCH carrying UCI may have the next priority, and PUSCH not carrying UCI may have the lowest priority relative to PUCCH and PUSCH carrying UCI, but equal priority relative to other PUSCH not carrying UCI. Power headroom may be computed for each serving cell as the difference between Pcmax,c and the computed transmit power before being limited by Pcmax,c or by power allocation to a higher priority channel. Two power headrooms may be computed and reported. Type 1 may be the headroom for the PUSCH alone computed as if the PUCCH does not exist even if the PUCCH actually does exist. Type 2 may include both the PUSCH and the PUCCH. Type 1 may be applicable to all serving cells. Type 2 may be applicable to PCell only. The power headroom report may include the PH values for all activated serving cells and may include the corresponding Pcmax,c values for those cells. Special rules may be followed when reporting PH for a serving cell that does not have an UL transmission (e.g., PUSCH and/or PUCCH) in the subframe in which the PH report (PHR) is sent. Headroom may be considered real for a channel that has a transmission and virtual for a channel that does not have a transmission in the subframe in which the PHR is sent.

In Release 10, a PUCCH power control equation may be:

$$P_{PUCCH}(i) = \min \begin{cases} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{cases}$$

where:

$P_{CMAX,c}(i)$ may be the configured maximum output power for a component carrier (CC) c and may be configured by the WTRU to a value between a high value equal to MIN (Pemax$_c$, Ppowerclass) and a low value equal to the minimum of Pemax,c and Ppowerclass minus a combination of allowed power reductions which depending on the situation may include one or more of MPR, A-MPR, P-MPR, deltaTc, and deltaTib. Pemax$_c$ may be a maximum allowed output power for CC c signaled to the WTRU via RRC signaling as p-max for that CC;

$\Delta_{F\_PUCCH}(F)$ may be a function of the PUCCH format used for the transmission;

$h(n_{CQI}, n_{HARQ}, n_{SR})$ may be a function of the PUCCH format and the number of bits of each type being transmitted;

$P_{O\_PUCCH}$ may be a parameter composed of 2 parameters ($P_{O\_NOMINAL\_PUCCH}$ and $P_{O\_UE\_PUCCH}$) provided to the WTRU via RRC signaling;

$PL_c$ may be the path loss term for the CC;

g(i) may be an adjustment factor, referred to as the PUCCH power control adjustment state, that may include the power ramp-up delta after RACH (which may be zeroed if a new $P_0$ is signaled) and the accumulation of TPC commands, $\delta_{PUCCH}$.

The accumulation may be as follows:

$$g(i) = g(i-1) + \sum_{m=0}^{M-1} \delta_{PUCCH}(i - k_m)$$

For FDD, M=1 and $k_0$=4.

TPC commands for PUCCH may be transmitted in PDCCH format 3/3A or with DL grants in PDCCH formats 1A/1B/1D/1/2A/2B/2C/2, and may be +1 or −1 dB in format 3A or 0 (hold), −1, +1, or +3 dB in the other formats. If the PDCCH with DCI format 1/1A/2/2A/2B is validated as an SPS activation PDCCH, or the PDCCH with DCI format 1A is validated as an SPS release PDCCH, then $\delta_{PUCCH}$ may be 0 dB.

In Release 8/9, a WTRU may synchronize to a cell and determine and maintain its DL timing. The WTRU may maintain UL timing based on its DL timing and timing advance commands received from the eNB. The eNB may send timing advance commands to the WTRUs in an attempt to align the signals received at the eNB (within a window) to improve the performance of the receiver. The timing advance may account for the distance, e.g., the path distance, between the WTRU and the eNB and may therefore need to change over time as the WTRU moves. The reception of the WTRU transmissions by the eNB may be via a direct path and/or via multi-path (which would be longer) and this may also change based on the movement of the WTRU or as the WTRU's environment changes.

Before doing any other type of UL transmissions to the cell, a WTRU may perform a RACH access, which may also be called a RACH procedure or random access procedure, in the UL using its DL timing as a starting point for its UL transmission. The RACH may have an extended guard period to avoid corrupting other WTRU's transmissions before UL timing is corrected by the eNB. The eNB may use reception of the RACH to determine the absolute timing advance to send to the WTRU, which it may send to the WTRU via a MAC Random Access Response (RAR). Timing Advance (TA) commands, which may be signaled via MAC in response to RACH, may be relative to current DL timing and may be signaled as a multiple of 16 Ts, where said multiple may range from 0 through 1282.

Over time, as the WTRU may move and/or its environment may change, the DL channel may change. As long as it is able, the WTRU may maintain DL sync with the eNB. The eNB may monitor reception from the WTRU and, in a closed-loop fashion, may control WTRU UL timing as follows: the eNB may send a TA command in subframe N, which may be via a MAC CE to update the WTRU UL timing, and the WTRU may respond by adjusting its UL timing accordingly at subframe N+6. Eventually, the eNB may send another TA command, and so forth. TA commands may apply to PUCCH, PUSCH, and SRS. TA commands, which may be signaled via MAC, may be relative to current UL timing, and may be signaled as a multiple of 16 Ts, where said multiple may range from −32 through +31.

Both the eNB and WTRU may maintain countdown timers called Time Alignment Timers (TAT), which may be started at the time of the most recent TA command. After the eNB TAT expires, the eNB may send a PDCCH order to a WTRU to perform a RACH procedure to reset its UL timing. If the WTRU TAT expires, the WTRU may cease transmissions to the eNB until receipt of a PDCCH order to perform the RACH procedure to reset its UL timing. The value of TAT, i.e., the amount of time between start and expiration, may be signaled to the WTRU via RRC signaling as a value timeAlignmentTimer.

In some embodiments, a cell includes a combination of downlink and/or uplink resources. Each of the downlink and uplink resource sets may be associated to a carrier frequency, which may be the center frequency of the cell, and a bandwidth. An eNodeB (eNB, e.g., eNB scheduler) may be responsible for managing resources of one or more cells. In LTE Release 10 carrier aggregation, a WTRU may communicate with one primary cell (PCell) and multiple secondary cells (SCell). The terms cell, serving cell, and component carrier (CC) may be used interchangeably.

In Release 10, the WTRU may communicate with one eNB, which may support multiple co-located intra-band cells (intra-band carrier aggregation). When supporting carrier aggregation, a WTRU may transmit and/or receive to and/or from multiple cells of an eNB. The WTRU may maintain DL and UL timing for the PCell and may apply that timing to all SCells. TA may be, e.g., may only be, provided for the PCell and may be applied to the SCells. The random access procedure using RACH may be, e.g., may only be, performed on the PCell. In Release 11, the WTRU may communicate with multiple intra-band and/or inter-band cells controlled by the same eNB, which may or may not (for example as in the case of remote radio heads) be co-located. Separate TA may be possible for cells with different timing requirements and possibly separate random access procedures as well.

There may be groups of cells, each of which may be termed a Timing Advance Group (TAG), for which a WTRU may maintain the same UL and/or DL timing for cells (e.g., all the cells) belonging to that TAG. For a given WTRU, the timing for cells in one TAG may be different from the timing in another TAG. A TA command for a cell belonging to a TAG may be applied by the WTRU to all its cells in that TAG. For a WTRU not supporting carrier aggregation, such as a R10 WTRU, the WTRU may be considered to have one TAG with its cells (e.g., all its cells or all its cells with configured UL) in the one TAG. Where TA is described herein as applying or being applied to a cell, it may also or instead mean TA applying or being applied to a TAG or all cells belonging to a TAG.

In order to support uplink feedback in a system, such as a multi-scheduler system, various approaches to PUCCH and PUSCH transmission may be used.

Figure 6:
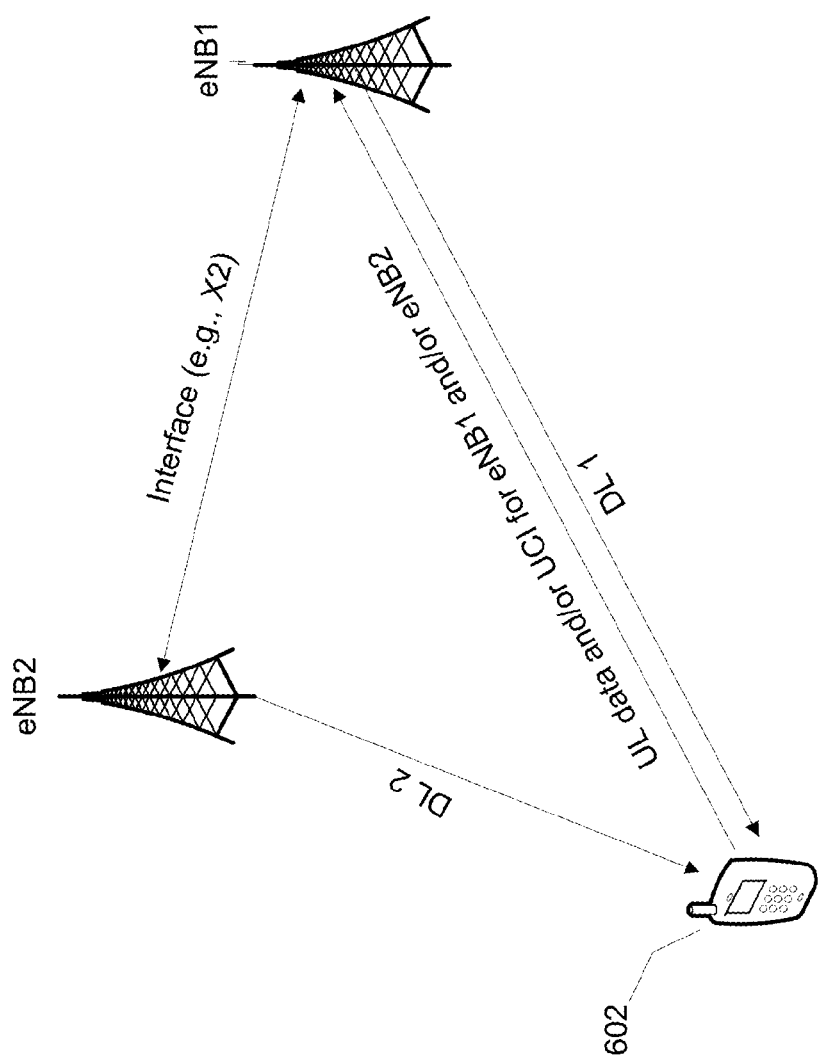
FIG. 6 illustrates a WTRU transmitting a single data and/or UCI intended for reception by a first eNB or cell only.

In one embodiment, for example as depicted in FIG. 6, a WTRU 602 may transmit a single PUCCH intended for reception by a first eNB or cell only. Other eNBs or cells may receive their UCI from the first eNB or cell, for example via an X2 or X2-like interface.

Figure 7:
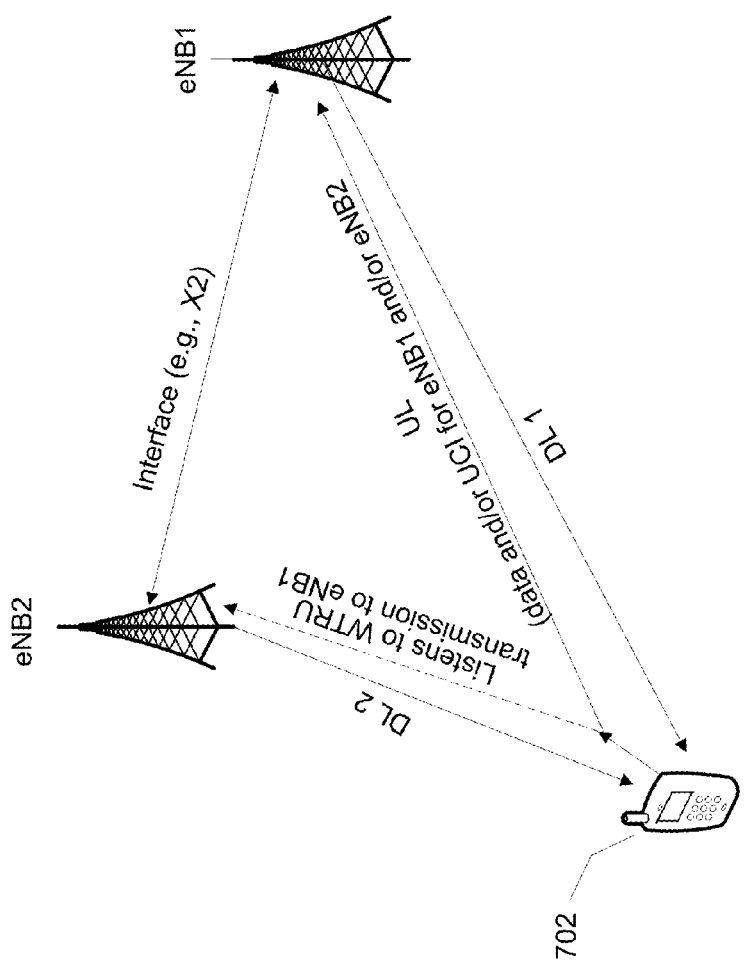
FIG. 7 illustrates a WTRU transmitting a data and/or UCI that may be received by a first eNB or cell and one or more additional eNBs or cells.

In one embodiment, for example as depicted in FIG. 7, a WTRU 702 may transmit a single PUCCH and/or PUSCH intended for reception by, or which may be received by, both a first eNB or cell and one or more additional eNBs or cells. The WTRU 702 may, for example, transmit PUCCH carrying UCI for both a first eNB and a second eNB on the resources of a first eNB. A second eNB may listen to and receive the UCI transmitted on the resources of the first eNB. As another example, the WTRU 702 may transmit PUSCH for a first eNB on the resources of the first eNB. Both the first eNB and the second eNB may attempt to receive and decode the PUSCH. If successful, the second eNB may relay (e.g., send) the PUSCH data it decoded to the first eNB for example via an X2 or X2-like interface. The first eNB may combine the PUSCH received from the second eNB with the PUSCH it receives to achieve better performance. As another example, a WTRU may transmit PUSCH for a first eNB on one set of resources of a first eNB and PUSCH for a second eNB on a second set of resources of a first eNB. The sets of resources may be different in at least one of frequency or time. Each eNB may only receive and/or attempt to decode the PUSCH transmitted on the resources intended for it.

Figure 8:
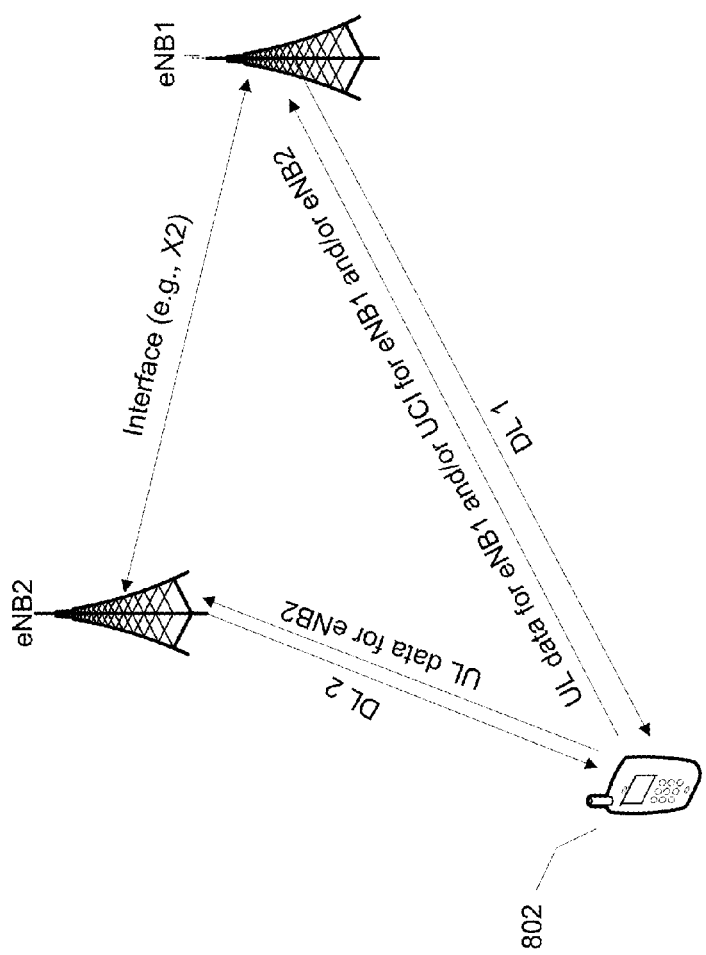
FIG. 8 illustrates a WTRU transmitting data to multiple eNBs and UCI to one eNB.
Figure 9:
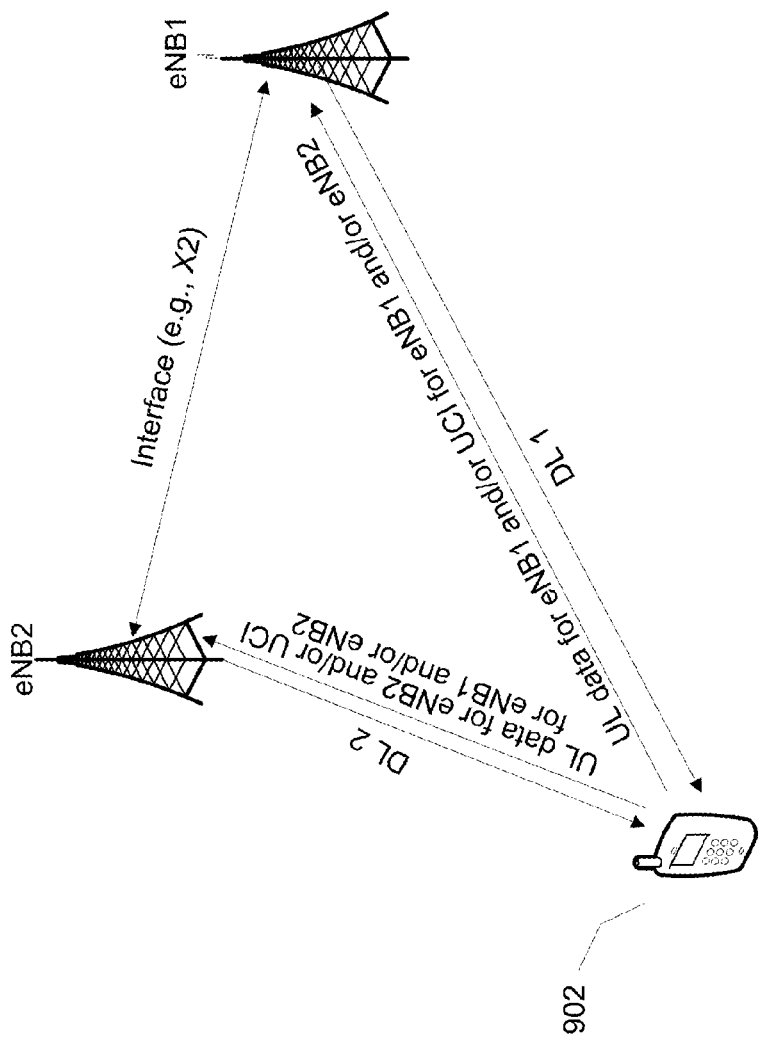
FIG. 9 illustrates a WTRU transmitting data and UCI to multiple eNBs.

In one embodiment, for example as depicted in FIGS. 8 and 9, a WTRU 802 or 902 may transmit separate PUCCH to each of one or more eNBs or cells, which may be carried in different frequencies, different PUCCH resources, or staggered in time. In one example, a WTRU may transmit separate PUSCH to a first eNB and a second eNB at least substantially simultaneously. The WTRU may also transmit PUCCH to a first eNB only or to a first eNB and a second eNB, where the PUCCH transmissions may not be simultaneous, for example, not at the same time, e.g., not in the same subframe. The PUCCH to each eNB may carry UCI corresponding to and/or intended for one or more eNBs. FIG. 8 depicts UCI transmission to one eNB. FIG. 9 depicts transmission of UCI to multiple eNBs. UCI transmitted to an eNB may include the UCI only for that eNB or for multiple eNBs. While not depicted in FIGS. 8 and 9, it is to be appreciated that each eNB and/or the WTRU may aggregate in the UL and/or the DL more than one cell.

For each of these uplink feedback approaches, methods and procedures can be used for handling power control and timing advance for the channel(s) carrying UCI and UL data. Moreover, methods and procedures can also be used for handling power control for multiple UL channels in the case of UL, such as multicarrier UL, scheduling in which the WTRU may simultaneously transmit combinations of one or more PUCCH and one or more PUSCH, which may be with or without UCI, and these transmissions may be intended for, received by, or controlled by multiple eNBs, cells, sets of cells, sites, beams, or schedulers, such as independent schedulers.

In some embodiments, systems and methods may be used to control power for a channel that may be or that may be intended to be received by multiple eNBs or cells.

A given channel, for example PUSCH or PUCCH, transmitted on one set of UL resources may at times be intended for reception by, or may be received by, multiple eNBs or cells, for example, as depicted in FIG. 7. These eNBs or cells may need different power in order for each to successfully receive, e.g., successfully decode, the channel. An example of this scenario is when a single PUCCH is intended for reception by, or may be received by, both a first eNB or cell and one or more additional eNBs or cells. The present disclosure provides systems and methods for setting the channel power such that multiple eNBs or cells intended to receive, or which may receive, the same channel are able to successfully receive the channel.

In addition, the multiple eNBs or cells intended to receive, or which may receive, the channel may each be able to control, possibly independently, the channel power, for example, by TPC commands. The present disclosure provides systems and methods for combining the power control commands for a single channel provided by multiple eNBs or cells.

At times, a WTRU may transmit separate PUCCH or PUSCH to each of multiple eNBs or cells. Separation may be by different frequencies, different PUCCH or PUSCH resources or staggering in time, for example, as depicted in FIGS. 8 and 9. Each PUCCH or PUSCH may need different power in order for each eNB or cell to successfully receive the channel. The present disclosure provides systems and methods for setting the channel power for each PUCCH or PUSCH such that the eNB or cell for which each PUCCH or PUSCH is intended is able to successfully receive the channel. The systems and methods provided may be applicable to PUSCH as well as PUCCH.

In some embodiments, an eNB or scheduler may manage the maximum allowed transmit power and power distribution for one or more cells.

In Releases 8, 9, and 10 of the LTE Standards, a WTRU may transmit on the resources of one or more cells controlled by the same eNB. A scheduler at the one eNB may manage the maximum WTRU allowed transmit power, p-max, for each cell via RRC (also known as Pemax,c). This value may be signaled to each WTRU individually and may be used for interference management.

The eNB may also provide UL grants to WTRUs for resources of one or more UL cells with the intent of maximizing one or more of coverage, capacity, and throughput while not causing a WTRU to exceed its output power limits which may be its configured maximum output power for each cell and for the WTRU as a whole. These configured maximum output powers may take into account WTRU Powerclass, Pemax,c, and allowed power reductions to enable the WTRU to meet various requirements such as emissions and SAR.

When a WTRU may transmit on resources of cells where each cell or group of cells may be controlled by a different eNB or scheduler and each eNB or scheduler may be independent and/or may be unaware of what the other eNB or schedulers may be scheduling, as may be the case, for example, in scenarios such as the ones depicted in FIGS. 8 and 9, management of WTRU transmit power may be difficult, and WTRUs may exceed their output power limits which may result in WTRU power scaling and reduced performance.

It is further observed that maximum power may also be an issue for the case illustrated, for example, in FIG. 7, in which a WTRU 702 may be transmitting one PUCCH or PUSCH intended for reception by, or which may be received by, more than one eNB or cell, or the case in which a WTRU may transmit separate PUCCH or PUSCH simultaneously to each of more than one eNB or cell, since power control and the maximum power rules only account for a single PUCCH and a single controlling eNB.

The present disclosure provides systems and methods to avoid the situation where the WTRU would exceed its maximum configured output power when the WTRU is communicating with multiple eNBs or schedulers, where each eNB or scheduler may provide scheduling for a configured set of cells known to the WTRU. In addition to not wanting to exceed the WTRU's maximum allowed power, it may be a goal of the eNB scheduler to maximize the use of available power, for example, by providing individual WTRUs with large grants for short periods of time. The present disclosure provides systems and methods to increase or maximize the use of available power when the WTRU is communicating with multiple eNBs or schedulers.

In some embodiments, a WTRU may determine a timing advance (TA) for a channel that may be or that may be intended to be received by multiple eNBs or cells.

In certain scenarios, for example as depicted in FIG. 7, a WTRU 702 may transmit a PUCCH or PUSCH on one set of UL resources intended for reception by, or which may be received by, multiple eNBs or schedulers. TA needed for reception, or the TA that would be determined, by one eNB or scheduler may be different from that for a different eNB or scheduler, yet only one timing advance value may be physically applied to the one transmission. The present disclosure provides systems and methods for the WTRU to determine how much TA to apply to an UL transmission intended for reception by, or which may be received by, multiple eNBs, cells of multiple eNBs or multiple schedulers, to satisfy the UL timing requirements of the multiple eNBs, the cells of multiple eNBs, or the multiple schedulers.

In some embodiments, a WTRU may determine a timing advance (TA) for separate PUCCH or PUSCH that may be transmitted to each of multiple eNBs or cells.

At times, for example as depicted in FIGS. 8 and 9, it may be necessary for a WTRU to transmit separate PUCCH or PUSCH to each of multiple eNBs or cells where separation may be by different frequencies, different PUCCH or PUSCH resources or staggering in time. Each PUCCH or PUSCH may need a different timing advance in order for each cell/eNB to successfully receive the channel. Methods and systems are provided for determining the Timing Advance for each PUCCH or PUSCH such that the cell or eNB for which each PUCCH or PUSCH is intended is able to successfully receive the channel.

In some embodiments, eNBs that may schedule UL grants for a WTRU may be provided with sufficient power and/or other information to improve performance and efficiency of scheduling decisions.

In a scenario in which a WTRU may transmit all of its channels on resources of cells managed by the same eNB, and that eNB may receive power headroom reports from the WTRU, the eNB may be able to estimate how to adjust the UL grants to utilize the WTRU's available power and to avoid the situation in which the WTRU exceeds its maximum power, which causes it to scale back and may result in performance degradation.

In a scenario, e.g., as depicted in FIGS. 7-9, in which a WTRU may transmit its channels on resources that are intended for reception by, or which may be received by, multiple eNBs, especially in the case in which multiple eNBs may individually schedule UL grants for that WTRU, some conventional power headroom and reporting, such as headroom reporting, methods may not be sufficient.

Methods and systems are disclosed that provide eNBs that may schedule UL grants for a WTRU with sufficient power and/or other information to improve performance and efficiency of scheduling decisions.

In some embodiments, systems and methods may be used to control power for a channel that may be received or that may be intended to be received by multiple eNBs or cells. For example, power can be controlled for PUCCH or PUSCH that may be received or that may be intended to be received by multiple eNBs or cells.

The scenario may be that the WTRU may transmit PUCCH or PUSCH on the resources of a specific cell and that PUCCH or PUSCH may be intended for reception by, or may be received by, one or more eNBs, cells, or schedulers, for example, as depicted in FIG. 7, which may include that cell or the eNB managing it and one or more other eNBs or schedulers.

PUCCH transmission may be in the frequency band and on the carrier frequency of the cell on which the PUCCH is being transmitted. Any other eNBs or schedulers needing to receive the PUCCH may need to be able to receive that frequency in that band.

As an example, the WTRU may transmit PUCCH on the PCell. Any eNB or scheduler needing to receive the PUCCH may need a means to receive the UL PCell transmission, for example, as depicted in FIG. 7. As another example, the WTRU may be told such as by RRC, MAC, or L1 signaling, on which cell (e.g., on which cell's resources) to transmit PUCCH. Any eNB or cell needing to receive the PUCCH may need a way to receive the resources of that cell.

The WTRU may be allowed to configure its maximum output power for CC c. In some embodiments, the WTRU may be allowed to configure its maximum allowed output power for PUCCH separately from its maximum allowed output power for PUSCH for a given CC. The WTRU may determine Pcmax,c for the PUCCH, (i.e., Pcmax,c_PUCCH) based on one or more of the following:

a PUCCH power limitation on the CC on which it is transmitting, which may be received by the WTRU via RRC, MAC, or L1 signaling;

Pcmax,c for the CC on which it is transmitting which may be the Pcmax,c for the PUSCH for the CC on which it is transmitting; and/or a limitation, such as a maximum allowed transmit power, which may provided to the WTRU for another cell (or eNB), possibly one for which the WTRU transmission may be intended or one which may receive the WTRU transmission; the WTRU may take into account this limitation always or only when the WTRU knows it will be transmitting information that is intended for that other cell or eNB (such as A/N or CQI for that other cell or eNB).

In some embodiments, the WTRU may set the Pcmax,c for the PUCCH to the lowest value among Pcmax,c for the CC on which it is transmitting and the maximum allowed transmit powers of the other eNBs or cells for which the WTRU transmission may be intended or which may receive the PUCCH transmission.

When determining transmit power, the WTRU may use path loss (PL) as an adjustment to compensate for distance from the cell, fading and other effects. When cells are not co-located, these effects may be different. Transmission frequency may also affect path loss.

In some embodiments, the WTRU may determine a path loss value, possibly in each subframe or in each subframe it will transmit PUCCH, for one or more of the following eNBs, and the WTRU may combine those path loss values into a single path loss value for use in the PUCCH power calculation: eNB of the PCell; eNB of the cell on which the WTRU is transmitting PUCCH; all or a subset of eNBs for which the WTRU has configured and possibly activated cells; and/or eNBs for which the WTRU knows it will be transmitting information (such as A/N or CQI for one or more cells of that eNB) possibly in that subframe.

As an example, the WTRU may, in each subframe or in each subframe it will transmit PUCCH, determine a path loss value for each eNB for which the WTRU has activated DL cells and combine those values.

To combine the path loss values from one or more eNBs, the WTRU may choose the worst case, e.g., largest path loss among the eNBs. In some embodiments, the WTRU may average or otherwise combine the path loss values.

As another example, if the WTRU knows that the PUCCH is only intended for reception by one eNB, possibly when the PUCCH is only carrying information for one eNB, the WTRU may use the path loss needed for that eNB.

When determining a path loss value or values in a particular subframe, that value or values may be based on measurements the WTRU made in that and/or previous subframes.

The WTRU may use one or more cells in the determination of path loss for an eNB. The WTRU may be configured with a set of cells that are managed by a particular eNB or scheduler. The WTRU may determine which cell or cells to use for PL of an eNB in at least one of the following ways:

A WTRU may choose a cell from each eNB for which it has configured and possibly activated DL cells to use for PL for that eNB;

A WTRU may use PCell PL for the eNB that has PCell;

For an eNB different from the one with PCell, a WTRU may use the configured, possibly activated, cell with the closest frequency to that of PCell for PL;

A WTRU may receive signaling, e.g., RRC signaling, which informs the WTRU which cell(s) to use for PL; this signaling may come from the PCell eNB or another eNB and may only be to identify cells of eNBs different from the PCell eNB; and/or A WTRU may choose the cell from an eNB, possibly only for eNBs that are not the PCell eNB, which has the highest PL.

In some embodiments, a WTRU may average, or otherwise combine, the PL values from all or a subset of the configured, possibly activated, cells of an eNB into one PL value for that eNB; possibly only for an eNB that is not the eNB of the PCell.

In some embodiments, when a WTRU determines path loss for a cell or eNB for which the PUCCH transmission may be intended, or which may receive the PUCCH, the path loss may be determined from a transmission that is on a different frequency and possibly a different frequency band than the frequency and frequency band that will be used for PUCCH transmission.

The WTRU may adjust the path loss value determined for an eNB to compensate for frequency difference. The adjustment may be made autonomously by the WTRU based on, for example, the frequency and/or band of the DL transmission for which the path loss was determined and the frequency and/or band of the PUCCH transmission.

In some embodiments, the WTRU may receive a compensation value, for example, via RRC or other signaling, for each eNB that may receive the PUCCH, with the possible exception of the PCell eNB.

In some conventional systems, $P_{0\_PUCCH}$ may be the sum of two parameters, $P_{0\_UE\_PUCCH}$ and $P_{0\_NOMINAL\_PUCCH}$, both of which may be provided by RRC signaling. $P_{0\_NOMINAL\_PUCCH}$ may be common for all WTRUs in a cell and $P_{0\_UE\_PUCCH}$ may be different for different WTRUs in a cell. For Release 10 (R10), these may be or may only be appropriate for a WTRU's PCell since the WTRU may only transmit PUCCH on the PCell.

When PUCCH may be intended for or received by multiple eNBs or schedulers, each eNB or scheduler may use a different value for one or more of these parameters. In some embodiments, the WTRU may receive one or more of:

eNB-specific values of one or more of $P_{0\_UE\_PUCCH}$, and $P_{0\_NOMINAL\_PUCCH}$; and cell-specific values of one or more of $P_{0\_UE\_PUCCH}$ and $P_{0\_NOMINAL\_PUCCH}$, which may be used by the WTRU to determine which values are associated with which eNB.

eNB- or cell-specific values may be known to the WTRU by association with a particular set of configured cells.

For each subframe in which the WTRU may transmit PUCCH, the WTRU may determine $P_{0\_PUCCH}$ for the transmission based on $P_{0\_UE\_PUCCH}$ and $P_{0\_NOMINAL\_PUCCH}$ for one or more of the following:

eNB of the PCell;

eNB of the cell on which the WTRU may transmit PUCCH;

all or a subset of eNBs for which the WTRU may have configured and possibly activated cells; and/or the eNB (or eNBs) for which the WTRU may know it may be transmitting information (such as A/N or CQI for one or more cells of that eNB), possibly in that subframe.

An eNB may be known to the WTRU by association with a set of configured cells.

The criteria the WTRU may use for choosing $P_{0\_UE\_PUCCH}$ and $P_{0\_NOMINAL\_PUCCH}$ may be different. For example, the WTRU may use the $P_{0\_NOMINAL\_PUCCH}$ of the PCell eNB and an eNB-specific value for $P_{0\_UE\_PUCCH}$ when transmitting. The WTRU may maintain cell-specific values, possibly instead of eNB-specific values. This may be the case if there is one cell per eNB or if there is only one cell managed by an eNB that is not the eNB managing the PCell.

In some embodiments, the WTRU may determine a PUCCH power control adjustment state g(i), also known as a transmit power control (TPC) factor.

When the WTRU may transmit PUCCH on one set of resources that may be intended for or received by multiple eNBs, e.g., as depicted in FIG. 7, the WTRU may receive TPC commands from more than one eNB for that PUCCH. It may be desirable for the WTRU to combine these TPC commands in such a way that may ensure that the eNB requiring the most power may be able to successfully receive the PUCCH without using more, or significantly more, power than necessary. One way to combine these commands may be to set the TPC to an up command if an up command is received from any eNB and set it to a down command if all eNBs send a down command.

In some embodiments, this approach may be extended to account for the possibility that commands are not just up and down, but include hold and specific increase/decrease values. This approach would likely work well if TPC commands are received from all eNBs at the same time and correspond to the same transmission from the WTRU. This, however, may not be the case. Each eNB may decode PUCCH only when there is a transmission with information intended for that eNB and there is no current requirement that an eNB must send a TPC command in response to a transmission. In addition, the WTRU may receive TPC commands in the same subframe that correspond to different transmissions it made, and it may receive TPC commands in different subframes that correspond to the same transmission it made.

For example, the WTRU may transmit PUCCH in subframe k. Based on this transmission, eNB1 may provide a DL grant in subframe k+4 with a TPC command to increase power 3 dB, which may be applied by the WTRU in subframe k+8. eNB2 may have no DL data to send until subframe k+5. eNB2 may send a DL grant in subframe k+5 with a TPC command, based on the last PUCCH transmission, to increase power 3 dB which may be applied by the WTRU in subframe k+9. Both eNB1 and eNB2 may want the power increased by 3 dB. Just using the TPC commands in each subframe may result in a 6 dB increase in power in subframe k+9, which is incorrect. To get the right power, the TPC in subframe k+5 from eNB2 should be ignored, since eNB1 already requested the increase.

In some embodiments, a non-accumulating TPC mode may be included for PUCCH, and the WTRU may combine the absolute TPC command values from different eNBs to obtain one value to use in the PUCCH power calculation. The WTRU may send the current value of the TPC factor to the eNBs. This embodiment may involve additional signaling and/or a new or modified DCI (DL control information) or DCI format.

In some conventional systems, PUCCH TPC commands may only operate in an accumulating mode. In this mode, the WTRU may receive commands to increase or decrease power by specified increments with respect to the current power in the subframe in which the TPC commands are applied. For PUSCH, however, there is another mode that may use absolute TPC commands as opposed to accumulating TPC commands. In this mode, the power control adjustment state for PUSCH, which is similar to the PUCCH TPC factor, may be set equal to the applicable TPC command.

In some embodiments, this concept may be applied to PUCCH such that, in a non-accumulating PUCCH TPC mode:

$$g(i)=\delta_{PUCCH}(i-k)$$

where, for example, k=4 for FDD,
where $\delta_{PUCCH}$ (i-k) is the TPC command that may be received in subframe i-k.

One or more of the following rules may apply to the non-accumulating PUCCH TPC mode:
The non-accumulating PUCCH TPC mode may be enabled and disabled as it is for PUSCH;
Enabling and disabling TPC accumulation for PUCCH may be controlled separately from enabling and disabling it for PUSCH;
The possible TPC command values for PUCCH may be the same as or a different set from those allowed for PUSCH which may be +1, -1, +4, and -4 dB; and/or
There may be more values allowed for PUCCH than PUSCH, which may involve a change to the signaling, for example, one or more new or modified DCI formats.

For situations in which TPC commands may be received from more than one eNB, the WTRU may determine the TPC factor, g(i), in a given subframe based on a combination of the TPC commands from the eNBs. In various embodiments, the WTRU may do one or more of the following:
For each subframe j for which the WTRU receives a TPC command from an eNB x, the TPC value for that eNB x may be the received value, e.g., the WTRU may set $\delta_{PUCCH\_ENBx}(j)$=received TPC command value from eNB x;
For each subframe j for which the WTRU does not receive a TPC command from an eNB x, the WTRU may assume that the last received TPC value for that eNB is still the one the eNB wants, e.g., the WTRU may set $\delta_{PUCCH\_ENBx}(j)=\delta_{PUCCH\_ENBx}(j-1)$;
In a subframe i in which the WTRU may or is to transmit PUCCH, the WTRU may determine one TPC value for subframe i-k, $\delta_{PUCCH}$ (i-k), from the individual TPC values of certain eNBs x in subframe i-k, $\delta_{PUCCH\_ENBx}$ (i-k), where, for example, k may be 4 for FDD. The eNBs x may include one or more of the following: the eNB of the PCell, the eNBs which may decode the PUCCH from this WTRU in this subframe or any subframe, the eNBs for which the PUCCH to be transmitted contains information for those eNBs, and/or the eNBs for which the WTRU has configured and possibly activated cells that may be configured with UL. The one TPC value for subframe i-k may be chosen by the WTRU to be the largest of the TPC values of the certain eNBs x in subframe i-k. The one TPC value for subframe i-k may be chosen by the WTRU to be an average or other combination of the TPC values of the certain eNBs x in subframe i-k; and/or After determining one TPC value for subframe i-k, $\delta_{PUCCH}$ (i-k), the WTRU may set the TPC factor for subframe i, g(i), to that TPC value, i.e., $g(i)=\delta_{PUCCH}$ (i-k), and the WTRU may use it in the PUCCH power calculation for transmission in subframe i.

To provide more range in an eNB's ability to control the TPC value, an additional offset parameter may be provided to the WTRU for each eNB. The WTRU may receive this offset value via RRC, MAC, or L1 signaling, for example. When determining the TPC value desired by each eNB, the WTRU may include this TPC offset value. For example, for eNB x, the WTRU may use $\delta_{PUCCH\_ENBx}(i-k)$+TPCoffest$_{\_ENBx}$ as the TPC value in subframe i-k. The WTRU may start using the TPC offset value as soon as it is received or after a delay, which may be a fixed delay, after it is received.

In some embodiments, the WTRU may receive different $P_{O\_PUCCH}$ values for different eNBs. The WTRU may use the $P_{O\_PUCCH}$ value for the PCell as the $P_{O\_PUCCH}$ value and determine an offset from that value for each eNB for which a $P_{O\_PUCCH}$ is received. This offset may be used by the WTRU as the TPC offset value described above. For example, the TPC offset value may be determined from the following equations:

$$P_{O\_PUCCH}=P_{O\_PUCCH}(PCell\ eNB)$$

$$TPCoffset_{\_ENBx}=P_{O\_PUCCH}(nonPCell\ eNB)-P_{O\_PUCCH}(PCell\ eNB).$$

In some embodiments, a greater TPC range may be accomplished by either RRC reconfiguration of TPC code points or addition of new TPC code points.

In some embodiments, the WTRU may provide a TPC factor to eNBs.

It is noted that when only one eNB may be providing non-accumulating TPC commands, that eNB may or may always know what the current value of the TPC factor is. When it may determine that more or less power may be needed, it may know what TPC command to send to replace the TPC factor value. When multiple eNBs send these non-accumulating TPC commands, in a given subframe, an eNB may not know for certain what the current TPC factor value is since the WTRU may be using the requested TPC factor value from a different eNB. The eNB may send a command that results in overshoot or undershoot of the desired power. When deciding what TPC command to send, the eNB may take this into account.

In some embodiments, there may be a mechanism for the WTRU to send, and possibly for the eNB to request, the value of the TPC factor. For example, the WTRU may provide the current value of the TPC factor in the transmitted PUCCH itself, possibly only if some criteria is met such as a change by more than a threshold or a change of which eNB may be driving the value of the TPC factor. This may only require a few additional bits, depending on the allowed range of the TPC factor.

In one example, the WTRU may send the current value of the TPC factor in a MAC CE. If, however, only one eNB may receive PUSCH, the other eNB may not be able to receive that transmission. Exchange over X2, which may be slow, may be involved.

In one embodiment, the WTRU may determine each eNB's desired TPC factor based on TPC commands received and the PUCCH transmissions to which those TPC commands may apply. The WTRU may then combine the individual values desired by the different eNBs to determine the value to use. This approach may use the accumulating TPC operation and may not require added signaling.

In an example embodiment, the WTRU may do one or more of the following:

The WTRU may keep track of the transmissions intended for each eNB, such as transmissions that contain information (e.g., A/N bits or CQI) intended for each eNB, and what the TPC factor was when the transmission was made;

When WTRU receives TPC from an eNB, it may determine which transmission the TPC corresponded to and the TPC factor at that time. This transmission may be the most recent transmission with information intended for the eNB that is at least some number of subframes earlier than the subframe in which the TPC command is received. For example, for TPC command received in subframe k, this transmission may be the most recent transmission with information intended for the eNB that was in a subframe<=k−x where x may, for example, be 4 for FDD. For the eNB of PCell, the WTRU may consider all transmissions to be intended for that eNB;

The WTRU may determine the TPC factor desired by an eNB in each subframe, call it $g\_desired\_{ENBx}(i)$ for eNB x in subframe i, for example, by using an approach described herein;

In each subframe in which the WTRU may transmit PUCCH, the WTRU may set the TPC factor to be used for PUCCH transmission to a value determined from a combination of the TPC factor values desired by all eNBs which may receive the transmission or possibly from a combination of the TPC factor values desired by all eNBs for which information in the PUCCH is intended in that subframe; and/or The WTRU may combine desired TPC factors from multiple eNBs, possibly those eNBs that may receive the transmission or possibly those eNBs for which information in the PUCCH is intended in that subframe, by taking the largest value among them.

The WTRU may do one or more of the following, possibly to determine the TPC factor desired by an eNB in a subframe. For FDD, when the WTRU receives TPC commands in subframe n, they may be intended to be applied to transmission in subframe n+4.

The WTRU may assume that an eNB, e.g., eNB x, may send non-zero TPC commands no more often than once per N subframes. N may be 8, for example, for FDD;

If a WTRU receives a non-zero TPC command from an eNB x within N subframes of a previously received non-zero TPC command from that same eNB x, the WTRU may consider the TPC command invalid and ignore such TPC command. An example way to accomplish this may be to have a prohibit timer that may be started upon receipt of a non-zero TPC command from an eNB. Non-zero TPC commands, possibly all TPC commands, from that eNB may be ignored by the WTRU until the timer expires;

In a given subframe in which a WTRU may receive a TPC command from an eNB x, e.g., subframe k, the WTRU may recall the TPC factor of the PUCCH transmission on which it may infer this TPC command was based. This subframe may be, for example, subframe k−j. The TPC factor may be designated g(k−j). Subframe k−j may be the most recent subframe in which the WTRU transmitted PUCCH or the most recent subframe the WTRU transmitted PUCCH with information intended for eNB x, possibly the most recent such subframe with j>=p and p may be 4 for FDD;

If a non-zero TPC command is received from eNB x by the WTRU in subframe k and is valid, the WTRU may determine the desired TPC factor which may be applied in subframe k+4 for that eNB as $g\_desired\_{ENBx}(k+4)=g(k-j)+TPC$ command value;

If a TPC command of 0 is received from eNB x in subframe k, the WTRU may do one or more of the following, possibly to determine whether this "hold" means to hold the power based on the last transmission or if eNB x may be waiting for a previously sent TPC to be applied. The WTRU may determine if a non-zero TPC command was received from eNB x in one of the previous P, which may be 7, subframes and, if so, may hold the last desired TPC factor for eNB x, e.g., set $g\_desired\_{ENBx}(k+4)=g\_desired\_{ENBx}(k+3)$. The WTRU may determine if there was a recent transmission to (e.g., with information intended for) eNB x at least q (for example, 4 for FDD) subframes after the last non-zero TPC command was received from eNB x and at least p (which may be 4) subframes before the current subframe. If so, the WTRU may consider this a valid TPC command and may treat it in the same manner as a valid non-zero TPC command as above. If not, the WTRU may hold the last desired TPC factor for eNB x; e.g., set $g\_desired\_{ENBx}(k+4)=g\_desired\_{ENBx}(k+3)$; and/or The WTRU may treat receipt of no TPC command the same way it treats receipt of a zero TPC command. Alternatively, if the WTRU does not receive a TPC command in subframe k for eNB x, the WTRU may hold the last desired TPC factor for eNB x., e.g., set $g\_desired\_{ENBx}(k+4)=g\_desired\_{ENBx}(k+3)$.

If an eNB is permitted to send multiple non-zero TPC commands close to each other in time, for example more often that once per N (e.g., 8) subframes, the results may be undesirable since it may be difficult to determine what the eNB intended. The WTRU, however, may handle this case in one or more of the following ways:

The WTRU may consider all non-zero TPC commands valid and treat them the same way, e.g., upon receipt of any non-zero TPC command from eNB x in subframe k, the WTRU may determine the desired TPC factor value for eNB x to be applied in subframe k+4 based on that TPC command and the PUCCH transmission in subframe k−j that it may have determined the TPC command to have corresponded to, and the WTRU may set $g\_desired\_{ENBx}(k+4)=g(k-j)+TPC$ command value; and/or If the WTRU receives a non-zero TPC command from eNB x that is within N subframes of a previously received non-zero TPC command from eNB x, the WTRU may assume that eNB x intended the WTRU to combine the TPC commands and the WTRU may set g_desired$_{ENBx}$(k+4)=g_desired$_{ENBx}$(k+3)+TPC value.

FIG. 3 illustrates a table 300 and provides an example sequence of subframes and an example of the TPC factor that may be used by the WTRU for UL transmission. Actual power may vary based on a number of factors, but only the TPC factor is shown. For each subframe, the figure shows the subframe number, the value of the TPC factor g(k) which may be used for transmission, whether the WTRU transmitted to the eNB, the TPC command if there was one, and the eNB's desired TPC factor.

FIG. 3 provides an example of an embodiment where a TPC command in subframe k corresponds to the most recent subframe j in which PUCCH was transmitted where k−j>=4, non-zero TPC commands are permitted no more often than every 8 subframes, and a TPC command received in subframe k is to be applied in subframe k+4. In this example, only one eNB is providing TPC commands to the WTRU.

In this example, referring to the triangles, the WTRU transmits PUCCH in subframe 0 using a TPC factor, g(k), of G in the determination of transmission power. The eNB may provide a DL grant in subframe 4 with a TPC command to increase power by 3 dB. The WTRU infers that the TPC command in subframe 4 is with respect to the transmission in subframe 0 and increases the TPC factor to G+3 in subframe 8. The WTRU also now understands that the eNB's desired TPC factor is G+3 starting in subframe 8.

Since the eNB is not permitted to send a non-zero TPC command for the next 7 subframes (5-11), it may send no TPC commands or TPC commands indicating 0 change in those subframes. This is represented by a TPC command of 0 in table 300.

Referring to the squares and the circles, subframe 12 (square) is the first subframe in which the eNB may send a non-zero TPC command and it would be with respect to the transmission in subframe 8 (square). Similarly, a TPC command in subframe 13 (circle) would be with respect to the transmission in subframe 9 (circle). In this example, the eNB sends either no TPC command or a 0 change TPC command in subframes 12 and 13. The WTRU understands that the eNB's desired TPC factor value for the subframes 4 later than 12 and 13, i.e., 16 (square) and 17 (circle), should remain at G+3 and makes no change.

Referring to the diamonds, in subframe 14, the eNB decides to decrease the power by 1 dB and sends a TPC command to lower the power by that amount. The WTRU infers that the TPC command in subframe 14 is with respect to the transmission in subframe 9 (not 10 since there was no transmission in subframe 10), and understands that the eNB's desired TPC factor in subframe 18 is G+2 and makes the change.

FIG. 4 depicts a table 400 and provides another example of an embodiment where a TPC command in subframe k corresponds to the most recent subframe j in which PUCCH was transmitted where k−j>=4, non-zero TPC commands are permitted no more often than every 8 subframes, and a TPC command received in subframe k is to be applied in subframe k+4. In this example, the PUCCH transmission may be received by one or two eNBs and both may provide TPC commands to the WTRU. For simplicity of the example, the WTRU is assumed to transmit PUCCH in every subframe, eNB1 always receives it and eNB2 receives it in some subframes.

Referring to the triangles, the WTRU transmits PUCCH in subframe 0 using a TPC factor, g(k), of G in the determination of transmission power. eNB1 may provide a DL grant in subframe 4 with a TPC command to increase power by 3 dB. The WTRU infers that the TPC command in subframe 4 is with respect to the transmission in subframe 0 and increases the TPC factor to G+3 in subframe 8. The WTRU also now understands that eNB1's desired TPC factor is G+3 starting in subframe 8.

Referring to the circles, eNB2 receives the WTRU transmission in subframe 1. The power of the transmission is based on a TPC factor of G+2 due to previous TPC commands. eNB2 sends a TPC command in subframe 5 to increase the power by 2 dB. The WTRU infers that the TPC command in subframe 5 is with respect to the transmission in subframe 1 which means eNB2's desired TPC factor is G+4 starting in subframe 9.

Since the eNB1 is not permitted to send a non-zero TPC command in the 7 subframes following its command in subframe 4 (subframes 5-11), the WTRU considers eNB1's desired TPC factor to remain at G+3, recognizes that eNB2 desires a higher TPC factor and applies the higher one, G+4 in subframe 9.

Referring to the squares, subframe 12 is the first subframe in which eNB1 may send a non-zero TPC command and it would be with respect to the transmission in subframe 8. In subframe 8, the transmission power was based on the TPC factor of G+3, which is still what eNB1 desires, so no change is requested (TPC command shown as 0) and there is no change to the TPC factor in subframe 16. For subframes 12 and 13, it is noted that the WTRU understands the desired TPC factors to be G+3 for eNB1 and G+4 for eNB2. If the WTRU is aware that only eNB1 needs to receive the transmission in those subframes, the WTRU may use a TPC factor of G+3 for those subframes.

Referring to the diamonds, in subframe 9, eNB1 sees an increase in power of 1 dB which it does not require, so it sends a TPC command to reduce the power by 1 dB in subframe 13 to affect a change in subframe 17. Since eNB2 has sent no commands indicating it desires a lower TPC factor than G+4, the WTRU will keep the TPC factor at G+4 (the larger of the desired TPC factors of the 2 eNBs) in subframe 17.

In some embodiments, the WTRU may maintain a separate TPC factor for each eNB. For embodiments such as ones in which PUCCH may be transmitted on the resources of a cell of one eNB and may be received by multiple eNBs, but not simultaneously, only one eNB may be expected to receive the PUCCH in any given subframe, the WTRU may determine the power for the PUCCH in that subframe using TPC commands of only that eNB instead of combining the TPC commands from multiple eNBs. The WTRU may maintain a separate TPC factor for each eNB and apply each eNB's TPC factor in the subframes in which the transmission is intended for that eNB.

In some embodiments, the WTRU may control power for PUSCH that may be received or that may be intended to be received by multiple eNBs or cells. In various embodiments, the WTRU may transmit a particular PUSCH, possibly PUSCH carrying UCI, on the resources of a specific cell and that PUSCH is intended for reception by, or may be received by, one or more eNBs or cells which may include that cell or the eNB managing it and/or one or more other eNBs or cells. One or more methods and systems described herein for handling power control for PUCCH that may be transmitted to, intended for, or received by multiple, or at least one of multiple, cells or eNBs may be applied to a PUSCH channel that may be transmitted to, intended for, or received by multiple, or at least one of multiple, cells or eNBs.

In some embodiments, systems and methods may be used to control power for separate channels that may be transmitted to each of multiple eNBs or cells. The separation may be by one or more of carrier frequency, resources, or time.

For example, for power control for separate PUCCH and/or PUSCH that may be transmitted to each of multiple eNBs or cells, PUCCH may use resources of one cell with PUCCH separation in time.

In various embodiments, where only one eNB may be expected to receive the PUCCH in any given subframe, the WTRU may determine the power for the PUCCH in that subframe based on the TPC commands of only that eNB instead of combining the TPC commands from multiple eNBs. As an example, the WTRU may only send UCI intended for eNB1 in designated subframes, such as even subframes, and UCI intended for eNB2 in other designated subframes, such as odd subframes. The UCI to each eNB may be the UCI for the current and previous subframes.

In each subframe, the WTRU may transmit PUCCH on the resources of a particular cell, e.g., the PCell, with UCI intended for one eNB, which may or may not be the eNB of the cell on which the PUCCH is transmitted, based on the subframes designated for each eNB. The WTRU may receive information, for example, via signaling, telling the WTRU in which subframes to transmit UCI for which eNB.

In the embodiments having separate PUCCH for each eNB, the PUCCH intended for a particular eNB may only need to provide UCI for the corresponding DL SCells associated with the particular eNB.

In some embodiments, for example, as depicted in FIGS. 8 and 9, the WTRU may maintain separate TPC factors for each eNB for which the PUCCH may be intended. The WTRU may do one or more of the following and the PUCCH TPC command received from eNB x in subframe j may be represented by $\delta_{PUCCH\_ENBx}(j)$:

- maintain separate TPC factors for each eNB, for example $g_{ENBx}(i)$;
- use only the TPC commands received from each eNB to update its TPC factor; receipt of no TPC command in a given subframe may be considered to be the same as receipt of 0 (no change);
- update the TPC factor for eNB x according to the regular PUCCH power control rules or a modified version of the regular PUCCH power control rules;
- update the TPC factor for eNB x for subframe i as $g_{ENBx}(i)=g_{ENBx}(i-1)+\delta_{PUCCH\_ENBx}(i-k)$, where k may equal 4 for FDD and $g_{ENBx}(0)$ may be the first value of that TPC factor after reset or possibly after any event that resets the TPC factor. The WTRU may do this regardless of whether or not it will transmit PUCCH intended for eNB x in that subframe (subframe i). Whether or not the WTRU may update the TPC factor for eNB x in every subframe, in a subframe in which the WTRU may transmit PUCCH intended for eNB x, the WTRU may update the associated TPC factor such that the resulting value of the TPC factor is the same as if it had been updated in every subframe; the WTRU may include all of the TPC commands from eNB x needed to achieve this result;
- use the TPC factor for eNB x in subframe i, $g_{ENBx}(i)$, when transmitting PUCCH intended for eNB x in subframe I;
- set $g_{ENBx}(0)$ to 0, and possibly restart accumulation from that point, if $P_{O\_PUCCH}$ changes, which may mean that the WTRU may receive a new value of $P_{0\_UE\_PUCCH}$;
- set $g_{ENBx}(0)$ to 0, and possibly restart accumulation from that point, if $P_{O\_PUCCH}$ for eNB x changes, which may mean that the WTRU may receive a new value of $P_{0\_UE\_PUCCH}$ for eNB x;
- have separate values for each eNB for one or more of $P_{O\_PUCCH}$, $P_{0\_UE\_PUCCH}$, and $P_{0\_NOMINAL\_PUCCH}$; and/or
- initialize all $g_{ENBx}(0)$ to the same value following a RACH procedure which may provide a power ramp-up value and possibly a TPC command in the random access response (e.g., msg2)—for example, set all $g_{ENBx}(0)$ to g(0) where $g(o)=\Delta P_{rampup}+\delta_{msg2}$.

In the description above, the TPC factor is described as being maintained on an eNB basis. It may also, or alternatively, be maintained on a cell, scheduler, or other basis.

When computing PUCCH power for transmission in a subframe i, the WTRU may set the PUCCH TPC factor for the transmission, g(i) or $g_c(i)$, to the appropriate eNB-specific value, $g_{ENBx}(i)$, or cell specific value. The approach described herein for PUCCH separation by frequency and/or resources may also be applied in the case of separation in time.

PUCCH transmission may be for different eNBs or cells and may be separated by frequency and/or resources. For embodiments in which the WTRU may transmit PUCCH intended for different eNBs or cells on different frequencies and/or resources, resources of different UL cells may be used, the WTRU may determine the power for each PUCCH separately using the R10 PUCCH power control equation, or the R10 PUCCH power control equation as modified by subsequent releases of the standard.

In embodiments with separate PUCCH for each eNB, the PUCCH intended for a particular eNB may, or may only need to, provide UCI for the corresponding DL SCells associated with the particular eNB. It may, however, provide UCI for more than one eNB. For each PUCCH, the WTRU may compute, determine, or receive via signaling a separate value for one or more of the following, and may use it for determining the power of that PUCCH whenever that PUCCH may be or is to be transmitted:

$P_{CMAX,c}(i)$
Pemax,c
$\Delta_{F\_PUCCH}(F)$
$h(n_{CQI}, n_{HARQ}, n_{SR})$
$P_{O\_PUCCH}$
$P_{O\_NOMINAL\_PUCCH}$
$P_{O\_UE\_PUCCH}$
$PL_c$
g(i)
$\delta_{PUCCH}$ For example, for each cell on which whose resources the WTRU may transmit PUCCH, the WTRU may compute, determine, or receive via signaling a separate value for one or more of the above, and may use it for determining PUCCH power when transmitting on those resources.

This embodiment may be applied, for example, to PUCCH separated in time, whether or not there is also separation in one or more of frequency and resources. For example, in each subframe, the WTRU may transmit PUCCH on the resources of one eNB or cell with the power that it determined for that PUCCH based on the values listed above for the eNB or cell for which the transmission is intended.

In some embodiments, the WTRU transmits a separate PUSCH, possibly PUSCH carrying UCI, to each of one or more eNBs or cells. Separation may be by one or more of frequency, resources, and time. One or more methods and systems described herein for handling power control for PUCCH which may be transmitted to, intended for, or received by one or more eNBs or cells may be applied to a PUSCH channel that may be transmitted to, intended for, or received by one or more eNBs or cells.

For the case where each PUSCH may use resources of a different cell, the power of each PUSCH may be computed in a similar fashion to Release 10, which supports simultaneous PUSCH transmissions on multiple CCs. For the case of separation in time, the WTRU may, for example, transmit PUSCH on the resources of one eNB or cell with the power it determined for that PUSCH based on the PUSCH power control values for the eNB or cell for which the transmission is intended.

A number of scenarios described herein may be generalized to the transmission of a channel using different parameters, which may be provided or derived, based on the target for the transmission. The channel may be a PUCCH or a PUSCH and the transmission target may be one or more of an eNB, cell, scheduler, and the like, as previously discussed. The parameters may include power control parameters such as at least one of as those described herein, timing parameters, such as Timing Advance, among others.

Figure 10:
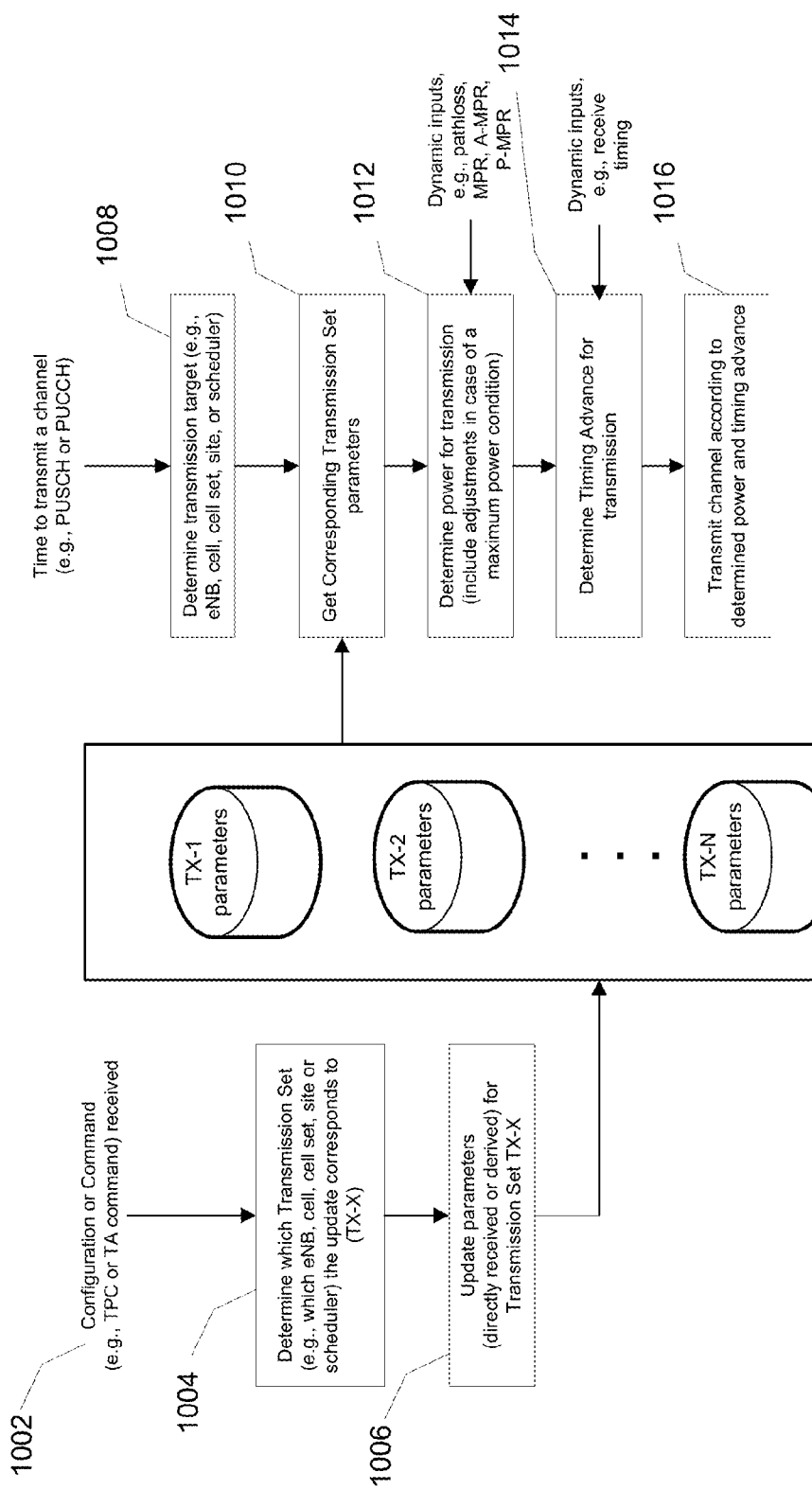
FIG. 10 depicts an example embodiment of WTRU parameter receipt, maintenance, and selection for transmission of a channel to at least one transmission target.

FIG. 10 depicts an example embodiment of WTRU parameter receipt, maintenance, and selection for transmission of a channel to at least one transmission target. As shown in FIG. 10, the WTRU may receive one or more parameters such as by configuration or command at a block 1002, determine which transmission set the parameters may belong to at a block 1004, determine any parameters which may be derived based on the received configuration or command 1006, and then save the parameters at a block 1006, associating them with at least one transmission set that may be used for transmission to at least one transmission target. An example of a derived parameter is the TPC factor, which may be derived from a TPC command.

When it may be time for a WTRU to transmit a channel, the WTRU may determine the transmission target(s) for the channel at a block 1008. Based on the transmission target(s), at a block 1010, the WTRU may use the corresponding set of transmission parameters, e.g., the transmission set. The WTRU may combine these parameters with other inputs, such as more dynamic inputs, for example path loss or certain allowed power reductions, which may be specific to a subframe. At blocks 1012 and 1014, the WTRU may determine the power for transmission and the timing advance for transmission and then transmit the channel accordingly at a block 1016.

It is noted that saving transmission sets of parameters is an example way to maintain the parameters the WTRU may need for transmission to at least one of multiple transmission targets. A WTRU may receive, update, derive, maintain, obtain, and use the parameters it may use or need for different transmission targets in any way and still be consistent with this disclosure.

For a WTRU that may communicate in the UL with multiple schedulers or eNBs, in some embodiments, one eNB may be responsible for managing the power distribution for the WTRU among those eNBs. This managing eNB (e.g., MeNB), may, for example, be the eNB of, or that provides, the WTRU's PCell. Alternatively, the MeNB may be a designated eNB that manages the power distribution and/or scheduling among a set of eNBs. The MeNB may or may not be one of the eNBs with which the WTRU may communicate. The MeNB may be an eNB, any of the equivalents of an eNB discussed herein, or another entity, such as a network entity.

The MeNB may determine one or more of the maximum allowed transmit power per-CC, per-band, per eNB, per scheduler, or per set of configured cells. Any of these determinations may be applicable per WTRU, per group of WTRUs, or for all WTRUs transmitting on or to that CC, band, eNB, scheduler, or set of configured cells. For example, the MeNB may do one or more of the following:

The MeNB may determine the maximum power a WTRU is permitted to transmit in each UL CC or cell or set of configured UL CCs or cells that may belong to the same or different eNBs. The MeNB, or another eNB, may provide this value to the WTRU for each CC or cell or set of configured UL CCs or cells, possibly via RRC signaling. This may be the Pemax,c for the CC or cell or set of configured UL CCs or cells. For each CC or cell or set of configured UL CCs or cells, the MeNB may provide this value to the eNB controlling the CC or cell or set of configured UL CCs or cells, possibly over an X2 or X2-like interface to that eNB. This may be the Pemax,c for the CC or cell or set of configured UL CCs or cells. This may be a CC or cell limitation different from the Pemax,c, that may just be used by the eNB, possibly for scheduling decisions, and may not be provided to the WTRU or WTRUs.

The MeNB may determine the maximum power a WTRU, a group of WTRUs, or all WTRUs are permitted to transmit to a given eNB. The MeNB may provide this value to each such eNB, possibly over an X2 or X2-like interface to that eNB. The MeNB or another eNB may provide this value to the WTRU. This may be like a Pemax for the eNB, $Pemax_{,eNB}$. In this case, the Pemax provided to an eNB or scheduler may be associated with a set of cells configured in the WTRU.

For a given eNB, based on the maximum power that a WTRU may transmit to that eNB, that eNB may determine the individual UL CC or cell power limits, e.g., Pemax,c, and signal those to the WTRU, or possibly to the MeNB which may signal them to the WTRU. The eNB or the MeNB may determine and signal to the WTRU the power limit for a configured set of cells, e.g., $Pemax_{,eNB}$.

The MeNB may set the maximum power allowed per eNB in a way to ensure that the WTRU would not exceed its maximum power across eNBs, possibly so the sum of the allowed powers per eNB may be equal to the WTRU Powerclass power, or possibly another value which is the highest overall allowed power of the WTRU, or possibly a lower value if desired such as for interference reduction, for example.

For example, for a 23 dBm WTRU communicating with two eNBs, the maximum allowed powers may be set to 20 dBm for each eNB so when the WTRU combines its transmit powers for each eNB, the total may not exceed 23 dBm. In this way, each eNB would be able to manage its scheduling without having to be concerned about what another eNB is scheduling.

For a given eNB, if the individual CC allowed maximum powers are set such that their sum does not exceed the eNB allowed maximum, the WTRU may not need to know the eNB allowed maximum. If, however, the sum of the individual CC allowed maximum powers may exceed the eNB allowed maximum, e.g., to allow scheduling flexibility among the CCs, then the WTRU may need the eNB allowed maximum value so it may limit the sum of its transmission powers to not exceed that maximum.

An eNB may provide the MeNB with one or more of a minimum required and a maximum allowed UL power for one or more of the eNB as a whole, one or more of its CCs, a WTRU and/or a group of WTRUs. The MeNB may choose a value within this min/max range and provide that to the eNB. Communication may be via an X2 or X2-like interface. An eNB may request more or less allowed power from the MeNB for one or more of the eNB as a whole, one or more of its CCs, a WTRU and/or a group of WTRUs. The MeNB may respond to this request with an allowed power value, possibly an updated one which complies with the request, for the eNB, CC(s), WTRU or group of WTRUs based on the request. Communication may be via an X2 or X2-like interface. The MeNB may change the maximum allowed power values and send them to the WTRUs and/or to one or more other eNBs.

The maximum allowed power values may apply to all subframes. Alternatively, the values may be subframe-specific. For example, a WTRU may be provided with a set of maximum power values for each CC, which may define different power limitations for different subframes. For example, a WTRU that is nominally capable of transmitting at its power class level, such as 23 dBm, may communicate with a number of UL cells, such as two. The WTRU may be provided with a set of maximum allowed power values, for example Pemax,c for each of the cells. This set of maximum allowed power values may allow the WTRU to transmit to one eNB or cell at some level or levels in each of a first and second set of subframes, while also allowing the WTRU to transmit to another eNB or cell at some level or levels in each of those first and second sets of subframes, without exceeding its maximum power. For example, the subframe sets may be even subframes and odd subframes and the WTRU may be allowed to transmit 22 dBm to a first eNB in the first set of subframes and 16 dBm to that eNB in the second set of subframes while also being allowed to transmit 16 dBm to a second eNB in the first set of subframes and 22 dBm to that eNB in the second set of subframes.

An MeNB, master scheduler, or other entity, may provide a scheduler, e.g., of an eNB, with a maximum grant, e.g., a maximum UL grant, for example in RBs, that it is permitted to allocate to a WTRU or WTRUs, for example, for at least one of its cells. This may be in response to at least one power headroom report that it may receive from or for at least one WTRU, for example, the WTRU for which it may provide the maximum grant.

This maximum UL grant may be for a certain subframe, set of subframes, schedule of subframes, and the like.

The MeNB, master scheduler, or other entity, may provide a scheduler, e.g., of an eNB, with a set of maximum UL grants or a schedule of maximum UL grants.

A scheduler, e.g., of an eNB may provide the MeNB, master scheduler, or other entity, with one or more of a minimum required UL grant and maximum desired UL grant for at least one WTRU. The MeNB, master scheduler, or other entity may choose a value within this minimum/maximum range and provide that to the eNB scheduler.

The MeNB may update power control information provided to other eNBs/schedulers. These power control information updates may be based on data requirements of radio bearers configured for transmission and/or available resources for transmission on particular eNBs, or other criteria. Each eNB/scheduler may further negotiate power control distribution. For example, an eNB/scheduler could request or reject specific MeNB power control limitations. Power control limitations and distribution may also be requested/rejected by the WTRU. In this case, the WTRU may request or reject power limitations associated with a configured set of cells.

Communication between the MeNB, master scheduler, or other entity and the scheduler, e.g., of an eNB, may be via an X2 or X2-like interface.

For each CC that may carry PUCCH, the PUCCH power calculation performed by the WTRU may be extended to be CC specific, which may mean one or more of $P_{O\_PUCCH}$ and g(i) may become CC specific, i.e., $P_{O\_PUCCH,c}$ and $g_c(i)$, respectively. For each CC that may carry PUCCH, the maximum configured output power determined by the WTRU, Pcmax,c may be different for PUCCH and PUSCH for that CC. This may be useful in the case that multiple eNBs may receive the PUCCH transmission. The WTRU may determine a $Pcmax\_{PUCCH,c}$ for a CC that may carry PUCCH separately from the Pcmax,c it determines for PUSCH.

For example:

$$P_{PUCCH,c}(i) = \min\begin{Bmatrix} P_{CMAX,c}(i), \\ P_{0\_PUCCH,c} + PL_c + h(n_{CQI}, n_{HARQ}, n_{SR}) + \\ \Delta_{F\_PUCCH}(F) + \Delta_{TxD}(F') + g_c(i) \end{Bmatrix}[dBm]$$

Another example:

$$P_{PUCCH,c}(i) = \min\begin{Bmatrix} P_{CMAX\_PUCCH,c}(i), \\ P_{0\_PUCCH,c} + PL_c + h(n_{CQI}, n_{HARQ}, n_{SR}) + \\ \Delta_{F\_PUCCH}(F) + \Delta_{TxD}(F') + g_c(i) \end{Bmatrix}$$

For the case in which the WTRU may transmit only PUSCH(s) in a CC, the PUSCH power equation may be:

$$P_{PUSCH,c}(i) = \min$$
$$\begin{Bmatrix} P_{CMAX,c}(i), \\ 10\log_{10}(M_{PUSCH,c}(i)) + P_{0\_PUSCH,c}(j) + \alpha_c(j) \cdot PL_c + \Delta_{TF,c}(i) + f_c(i) \end{Bmatrix}$$

[dBm]

For the case in which a WTRU may transmit a PUCCH in the same CC as a PUSCH, the PUSCH power computation may be modified to include a CC specific PUCCH power, for example:

$$P_{PUSCH,c}(i) = \min$$
$$\begin{Bmatrix} 10\log_{10}(\hat{P}_{CMAX,c}(i) - \hat{P}_{PUCCH,c}(i)), \\ 10\log_{10}(M_{PUSCH,c}(i)) + P_{0\_PUSCH,c}(j) + \alpha_c(j) \cdot PL_c + \Delta_{TF,c}(i) + f_c(i) \end{Bmatrix}$$

[dBm]

Where:
$\hat{P}_{PUCCH,c}(i)$ is the linear value of $P_{PUCCH,c}(i)$

For the case in which a WTRU may transmit one or more simultaneous PUCCH in a subframe, and the total transmit power of the simultaneous PUCCH transmissions may exceed the WTRU configured maximum output power, $\hat{P}_{CMAX}(i)$, the WTRU may scale the PUCCH powers $\hat{P}_{PUCCH,c}(i)$ for example according to:

$$\sum_c w(i) \cdot \hat{P}_{PUCCH,c}(i) \le \hat{P}_{CMAX}(i)$$

In some embodiments, the PUCCH transmissions may have different priorities. For example, PUCCH transmission to the PCell may have highest priority. In the event the PUCCHs have different priorities, the WTRU may allocate power to the PUCCHs in priority order, highest to lowest. If there are multiple low priority PUCCHs, the WTRU may scale their power equally such that their sum does not exceed the power remaining after power has been allocated to the higher priority PUCCH(s).

For example, if the PUCCH to the PCell has highest priority, the WTRU may allocate power to that PUCCH first. If there are additional PUCCH that have equal but lower priority, the WTRU may allocate the remaining power to those PUCCH equally.

For example, for CC c other than the PCell, the WTRU may scale the PUCCH powers equally such that:

$$\hat{P}_{PUCCH,Pcell}(i) = \min(\hat{P}_{PUCCH,Pcell}(i), \hat{P}_{CMAX}(i)) \sum_{c \neq Pcell} w(i) \cdot \hat{P}_{PUCCH,c}(i) \leq$$

$$\hat{P}_{CMAX}(i) - \hat{P}_{PUCCH,Pcell}(i)$$

If the WTRU is not able to transmit PUCCH to all cells to which it was supposed to transmit PUCCH, the WTRU may indicate this to one or more of the cells, such as the PCell.

For embodiments in which the WTRU may transmit one or more PUSCH with UCI in a subframe, and the total transmit power of the WTRU when combining any PUCCH and PUSCH with UCI channels may exceed its configured maximum output power, $\hat{P}_{CMAX}(i)$, the WTRU may first allocate power to any PUCCH transmissions in that subframe and then allocate the remaining power to PUSCH with UCI transmissions. The WTRU may treat PUSCH with UCI transmissions equally or may prioritize the transmissions for example based on the cells on which they are transmitted. Transmissions to the PCell may have highest priority.

For example, the WTRU may scale the PUSCH with UCI transmissions, $\hat{P}_{PUSCHw/UCI,c}(i)$, according to:

$$\sum_c w(i) \cdot \hat{P}_{PUSCHw/UCI,c}(i) \leq \left(\hat{P}_{CMAX}(i) - \sum_c \hat{P}_{PUCCH,c}(i)\right)$$

If there is no power remaining after allocating power to the PUCCH channels, the weights of all non-PUCCH channels may be set to zero. If PUSCH with UCI on the PCell has higher priority than other PUSCH with UCI transmissions, the remaining power after subtracting PUCCH power may first be allocated to the PUSCH with UCI on the PCell and then remaining power after that may be allocated to the other PUSCH with UCI and those PUSCH with UCI may be scaled equally.

For example, for CC c other than the PCell, the WTRU may scale the PUSCH with UCI powers equally such that:

$$\sum_{c \neq Pcell} w(i) \cdot \hat{P}_{PUSCHw/UCI,c}(i) \leq$$

$$\left(\hat{P}_{CMAX}(i) - \sum_c \hat{P}_{PUCCH,c}(i) - \hat{P}_{PUSCHw/UCI,Pcell}(i)\right)$$

Use of this equation assumes that it has already been determined that there is power remaining after allocation to any PUCCH channels and PUSCH with UCI on the PCell. If there is no power remaining after allocation to those channels, weights of all other channels may be set to zero.

In some embodiments, both PUCCH and PUSCH with UCI on the PCell have higher priority than any PUCCH and PUSCH with UCI on any other cell. In this case, the WTRU may allocate the power to the PCell PUCCH first, then the PCell PUSCH with UCI, then the remaining PUCCH and then the remaining PUSCH with UCI.

Terms in the equations may be zero if there are no corresponding transmissions in the subframe.

For the case in which the WTRU may transmit PUSCH without UCI, and the total transmit power of the these and any PUCCH transmissions and any PUSCH w/UCI transmissions may exceed $\hat{P}_{CMAX}(i)$, the WTRU may first allocate power to any PUCCH transmissions in that subframe and then allocate remaining power to any PUSCH with UCI transmissions and then allocate remaining power to any PUSCH w/o UCI transmissions. The WTRU may treat multiple PUSCH w/o UCI equally. The WTRU may scale $\hat{P}_{PUSCHwo/UCI,c}(i)$ according to:

$$\sum_c w(i) \cdot \hat{P}_{PUSCHwo/UCI,c}(i) \leq$$

$$\left(\hat{P}_{CMAX}(i) - \sum_c \hat{P}_{PUCCH,c}(i) - \sum_c \hat{P}_{PUSCHw/UCI,c}(i)\right)$$

Use of this equation assumes that it has already been determined that there is power remaining after allocation to any PUCCH channels and any PUSCH with UCI channels. If there is no power remaining after allocation to those channels, weights of all other channels may be set to zero.

In the power scaling descriptions and example equations, $\hat{P}_{PowerClass}$ may be substituted for $\hat{P}_{CMAX}(i)$, and any transmission that does not exist may be represented as zero, e.g., if there is no transmission of PUCCH in CC c, $\hat{P}_{PUCCH,c}(i)=0$. In other words, the summation over index c may be interpreted to mean only include the CCs c in the summation for which the channel in the summation exists.

For embodiments in which the WTRU may simultaneously transmit in multiple bands or to multiple eNBs and the WTRU may transmit on at least 2 CCs in one band (or to one eNB) while at the same time transmitting on at least one CC in another band (or to another eNB), additional power scaling may be used. In this case, in addition to having a CC power limit, e.g., Pcmax,c, and a WTRU power limit, e.g., Pcmax, the WTRU may also have a per-band power limit and/or a per-eNB power limit.

Figure 12:
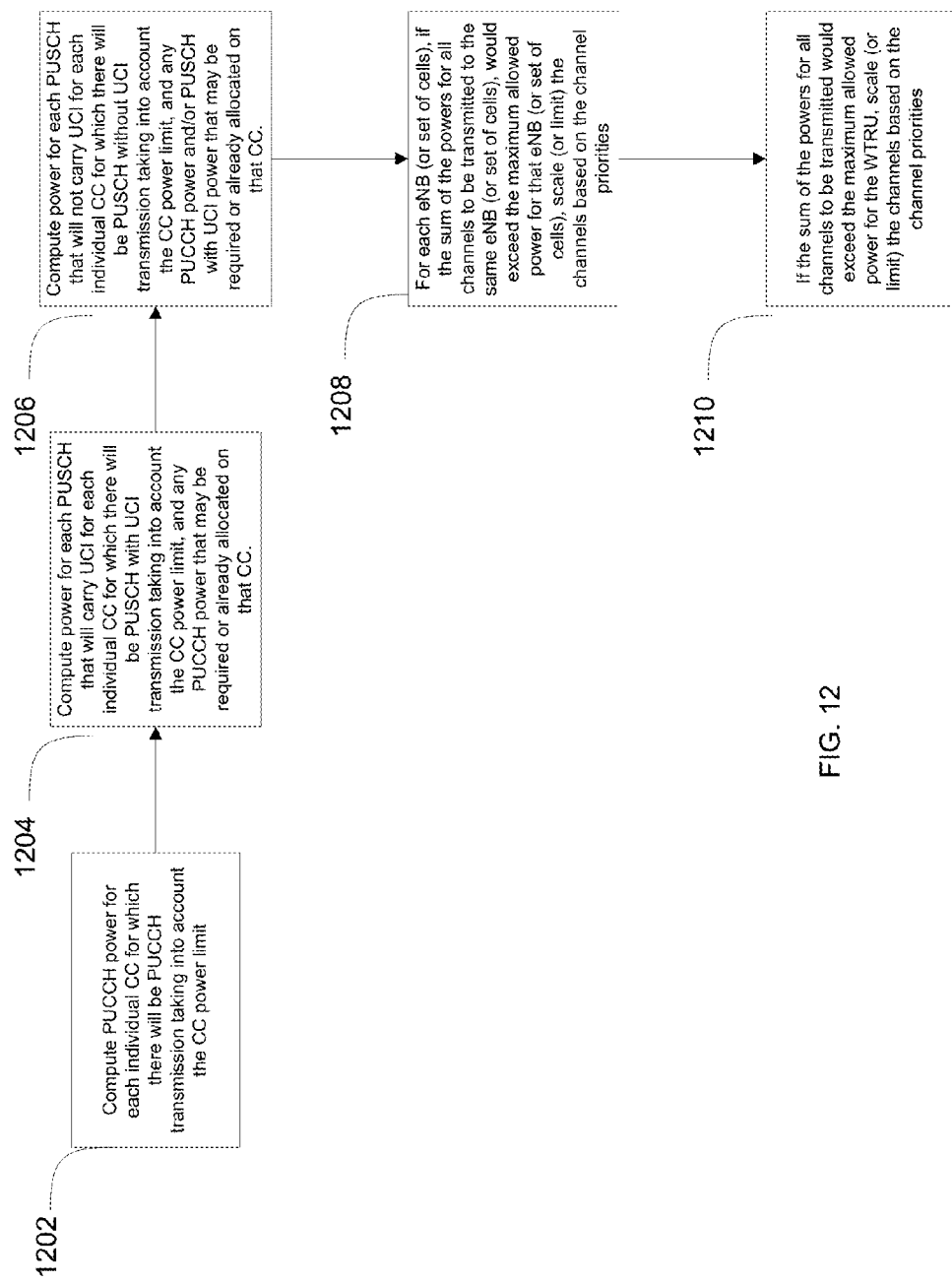
FIG. 12 is a process flow diagram illustrating power control according to an example embodiment.

The WTRU may perform power control using one or more of the following steps for channels to be transmitted, which may or may not be in the following order as shown in FIG. 12:

At a block 1202, if there are any PUCCH to be transmitted compute PUCCH power for each individual CC taking into account the CC power limit, e.g., WTRU configured maximum output power, Pcmax,c, which may be the value for the CC or for the specific channel of the CC, and cap, e.g., limit, the power to the maximum;

At a block 1204, compute the power for each PUSCH that will carry UCI for each individual CC taking into account the CC power limit, e.g., WTRU configured maximum output power, Pcmax,c, which may be the value for the CC or for the specific channel of the CC, and any PUCCH power that may be required or already allocated on that CC. PUSCH carrying UCI may only be allocated power from any power remaining after power is allocated to the PUCCH on the CC;

At a block 1206, compute the power for each PUSCH that will not carry UCI for each individual CC taking into account the CC power limit, e.g., WTRU configured maximum output power, Pcmax,c, which may be the value for the CC or for the specific channel of the CC, and any power that may be required or already allocated on that CC for PUCCH or PUSCH carrying UCI. PUSCH not carrying UCI may only be allocated power from any power remaining after power is allocated to the PUCCH and PUSCH carrying UCI on the CC;

For each band (not shown), compute or otherwise determine the sum of the powers for the channels in the same band of the same eNB or set of cells, which may already have been capped based on CC power limits, and if the maximum allowed power for that band for that eNB may be exceeded, scale or limit the power of the channels based on the channel priorities to not exceed said maximum allowed power. The maximum allowed power for that band may be a WTRU configured maximum output power which may take into account one or more of a band power limit or eNB power limit provided by the network, the WTRU powerclass, and allowed power reductions to enable the WTRU to meet requirements such as emissions and SAR; At a block 1208, for each eNB or set of cells, e.g., configured set of cells, compute or otherwise determine the sum of the powers for all channels to be transmitted to the same eNB or set of cells, which may have already been capped based on CC power limits and/or capped or scaled based on band limits, and if the maximum allowed power for that eNB or set of cells may be exceeded, scale or limit the channels based on the channel priorities to not exceed said maximum allowed power. The maximum allowed power for an eNB or set of cells may be a WTRU configured maximum output power which may take into account one or more of a eNB power limit provided by the network, the WTRU powerclass, and allowed power reductions to enable the WTRU to meet requirements such as emissions and SAR.

At a block 1210, compute or otherwise determine the sum of the powers for all channels to be transmitted which may have already been capped based on CC power limits and/or capped or scaled based on band limits, eNB limits, or limits associated with a configured set of cells, and if the maximum allowed power for the WTRU may be exceeded, scale or limit the channels based on the channel priorities to not exceed said maximum allowed power. The maximum allowed power for a WTRU may be a WTRU configured maximum output power which may take into account one or more of a WTRU power limit provided by the network, the WTRU powerclass, and allowed power reductions to enable the WTRU to meet requirements such as emissions and SAR.

In some embodiments, systems and methods may be used to determine a timing advance (TA) for a channel, e.g., PUCCH, that may be received or that may be intended to be received by multiple eNBs or cells. The WTRU may determine that TA that may reduce or minimize the maximum TA error.

In one embodiment, multiple eNBs, i.e., one or more eNBs, may signal PUCCH TA commands to the WTRU, which may be distinct from other TA commands, and the WTRU may receive these PUCCH TA commands from at least one of the multiple eNBs and may adjust the timing advance of the PUCCH, which may be received by at least one of the multiple eNBs.

To allow the channels, e.g., PUSCH and SRS, being received by one eNB to be unaffected by the TA to be used for PUCCH, in some embodiments the WTRU may maintain separate UL timing for PUCCH. The WTRU may receive and apply TA separately to PUCCH and to other transmissions such as PUSCH and SRS.

The approach of applying separate TA to PUCCH transmissions could alternatively be applied to PUSCH w/UCI instead of PUCCH, or in addition to PUCCH.

Until an eNB has received a PUCCH transmission and can send a PUCCH TA command to the WTRU, the WTRU may assume that the PUCCH timing, e.g., the timing to use for PUCCH transmissions, is the same as PUSCH timing, e.g., the timing to use for PUSCH transmissions, for the site.

As an alternative, the WTRU may use one TA for all channels it transmits on resources of the same cell, possibly with the UL timing needed for the PUCCH determining the UL timing to be used for all.

The WTRU may receive PUCCH TA commands from multiple eNBs, possibly at different times. The WTRU may combine these TA commands into one PUCCH TA to be applied in order to optimally satisfy the timing needs of the eNBs that may receive the PUCCH transmission. eNBs that may receive the PUCCH transmission may refer to one or more of:

eNB of the PCell;
eNB of the cell on which PUCCH is being transmitted;
all or a subset of eNBs for which the WTRU has configured and possibly activated cells; and/or
eNBs for which the WTRU knows it will be transmitting information, such as A/N or CQI for one or more cells of that that eNB, possibly in that subframe.

The criteria of optimality may be, for example, that the WTRU changes PUCCH timing such that, after the change is applied, the largest PUCCH timing error is minimized. This may, for example, be expressed as:

$$\Delta_{PUCCH} = \arg\min_{\Delta_k \in \Omega}\{\max |TA_n - \Delta_k|\}$$

Where
$\Delta_{PUCCH}$ is the amount of timing advance applied to the PUCCH, with respect to the current PUCCH timing, in response to the received set of N timing advance commands, for example from N eNBs, relative to current PUCCH timing, $TA_n$, where n=0, 1, ..., N−1.
$\Omega$ is the set of possible amounts that the WTRU could change the PUCCH timing, for example, integer multiples of 16 $T_s$.

Figure 5:
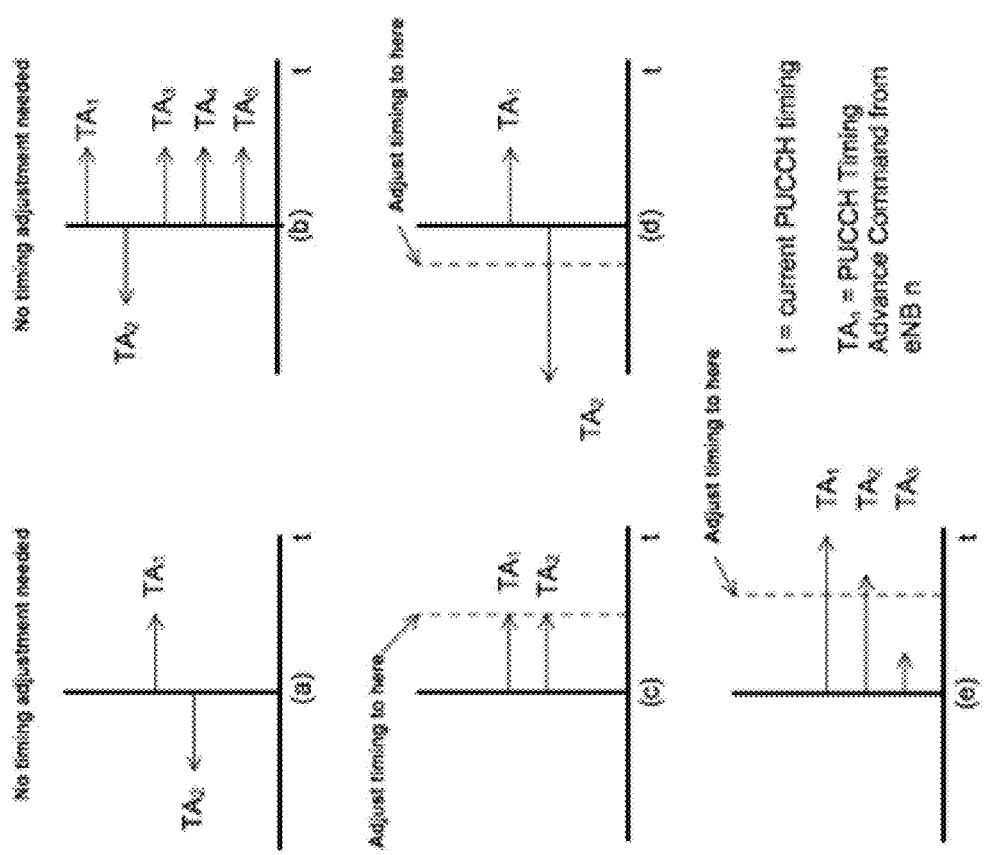
FIG. 5 illustrates examples of Timing Advance (TA) commands received from a number of eNBs and depicted relative to the current PUCCH timing.

FIG. 5 illustrates five examples of TA commands received from a number of eNBs and depicted relative to the current PUCCH timing. These TA commands are shown as relative to current UL timing, but the principle may be applied to absolute TA commands, which are relative to the WTRU's DL timing, by converting them to being relative to the WTRU's current PUCCH timing. These are the TA commands received by the WTRU. In these examples, an arrow to the right indicates a positive TA command, an arrow to the left indicates a negative TA command, and the length of an arrow indicates the magnitude of the command.

FIG. 5(a) shows commands from two eNBs for the same amount of TA, but in opposite directions. In this case, the WTRU does not need to make a PUCCH timing adjustment.

FIG. 5(b) shows commands from five eNBs, four commands for the same amount of positive TA, and one for the same amount of negative TA. In this case, the WTRU does not need to make a PUCCH timing adjustment.

FIG. 5(c) shows commands from two eNBs for the same TA in the same direction. In this case, the WTRU would change TA by the amount of the TA commands.

FIG. 5(d) shows commands from two eNBs for different TA, the first being some amount of positive TA, e.g., +10 units, the second being twice that amount of negative TA, e.g., −20 units. In this case, the WTRU applying negative TA of −5 units yields PUCCH timing error of the two eNBs of +15 units for eNB 1 and −15 units for eNB 2. Since applying a PUCCH timing adjustment of any value other than −5 would yield at least one of the PUCCH timing errors as magnitude greater than 15, a TA of −5 would be the optimal adjustment to minimize the maximum error in this example.

FIG. 5(e) shows commands from three eNBs for different TA, being in some amounts of positive TA, e.g., 40, 30, and 10 units, respectively. In this case, the WTRU applying a positive TA of +25 units yields a PUCCH timing error of the three eNBs of −15, −5, and +15, respectively. Since applying a PUCCH timing adjustment of any value other than +25 would yield at least one of the PUCCH timing errors as magnitude greater than 15, a TA of +25 units would be the optimal adjustment to minimize the maximum error in this example.

In order to combine the TA commands from multiple eNBs for a particular subframe, the WTRU may need to determine the TA needed by each eNB for that subframe. The WTRU may accomplish this in one of a number of example ways.

In one example, the WTRU may directly receive all the PUCCH TA commands simultaneously from all eNBs that may receive the PUCCH. This may be accomplished in one or more of the following ways:
  all eNBs may be required to be provide their TA commands at the same time, for example in specific subframes; and/or
  the WTRU may receive all of the PUCCH TA commands via signaling from one eNB or cell such as the PCell. That eNB or cell may receive the TA commands from the other eNBs over an X2 or X2-like interface.

Based on the TA commands received in subframe N, the WTRU may change the PUCCH timing at some fixed time, e.g., at subframe N+6. The WTRU may change the timing in a manner that minimizes the maximum timing error for all eNBs that may receive the PUCCH.

In another example, the WTRU may receive TA commands from some or all eNBs at different times or at the same time but based on transmissions with different applied TA. In this case, the WTRU may adjust PUCCH timing at some fixed time after receipt of a TA request from at least one eNB in subframe N, e.g., at subframe N+6, based on actual received TA commands and inferred TA commands in subframe N. The WTRU may do one or more of the following:
  the WTRU may infer on which previous PUCCH transmission a received TA command from an eNB is based;
  the WTRU may infer a TA command received from an eNB was based upon a transmission with a previously applied TA; and/or
  in a given subframe N, for a given eNB x, the WTRU may compute what eNB x would have signaled as a TA command had it based it upon the presently applied TA, and the WTRU may use that computed TA rather than the most recently received TA command from eNB x. The most recently received TA command may have been received in the current subframe N or a previous subframe.

Based on the actual and inferred TA commands for subframe N, the WTRU may change the PUCCH timing at some fixed time, e.g., at subframe N+6 in a manner that minimizes the maximum timing error for all eNBs which may receive the PUCCH.

In another example, a WTRU may receive, along with a TA command, an indication of the subframe on which the command is based. In this way, the WTRU may determine the actual total TA desired from the total TA of that subframe and the requested delta. The WTRU may assume the total TA desired does not change until a new command is received.

As an alternative to the WTRU maintaining one PUCCH timing, the WTRU may maintain one separate PUCCH timing for each combination of eNBs, and apply combination-specific PUCCH timing to PUCCH transmissions intended for reception by the eNBs of a particular combination. For example, if cells in four eNBs are configured, there are four ways or combinations of one eNB, six combinations of any two of the eNBs, four combinations of any three eNBs, and one way or combination of four eNBs, for a total of fifteen combinations. For the WTRU to update each combination's PUCCH timing based on TA commands from the various eNBs, the WTRU may need to know, for each received PUCCH TA command from a particular eNB, the particular prior PUCCH transmission upon which the command was based, such that the WTRU knows which combination's PUCCH timing the command is relative to. This could be based upon a specified time difference, e.g., TA commands are sent only in subframe N+k, where N is the subframe of a particular PUCCH transmission, and k is some specified or configured value. Alternatively, TA commands could include a subframe offset value, indicating the time difference between the PUCCH transmission and TA command.

The WTRU may maintain separate PUCCH TA for each eNB. In embodiments in which PUCCH is transmitted on the resources of a cell of one eNB and may be received by multiple eNBs, but not simultaneously, for example, only one eNB is expected to receive the PUCCH in any given subframe, the WTRU may determine the timing advance for the PUCCH in that subframe based on TA commands of only that eNB instead of combining the TA commands from multiple eNBs. The WTRU may maintain a separate TA for each eNB and apply each eNB's TA in the subframes in which the transmission is intended for that eNB. FIG. 10 depicts an example of how this may be accomplished. For TA only, the steps relating to power control would not apply.

In some embodiments, the WTRU may determine a timing advance (TA) for PUSCH that may be received or that may be intended to be received by multiple eNBs or cells. The scenario may be, for example, that the WTRU transmits a particular PUSCH, possibly PUSCH carrying UCI, on a specific cell and other cells and/or eNBs are expected to receive that PUSCH. One or more methods and procedures described herein for handling timing advance for PUCCH which may be transmitted to, intended for, or received by at least one of multiple cells or eNBs may be applied to a PUSCH channel that may be transmitted to, intended for, or received by at least one of multiple cells or eNBs.

In some embodiments, such as depicted in FIGS. 8 and 9, systems and methods may be used to determine timing advance (TA) for separate channels, such as PUCCH, that may be transmitted to each of multiple eNBs or cells. The separation may be by one or more of carrier frequency, resources, or time.

Given a scenario in which only one eNB may be expected to receive the PUCCH in any given subframe, the WTRU may determine the timing advance for the PUCCH in that subframe based on the TA commands of only that eNB instead of combining the TA commands from multiple eNBs. For example, as described above, the WTRU may only send UCI intended for eNB1 in designated subframes such as even subframes and UCI intended for eNB2 in other designated subframes such as odd subframes. In each subframe, the WTRU may transmit PUCCH on a particular cell of one of the eNBs, e.g., the PCell, with UCI intended for one eNB, which may or may not be the eNB of the cell on which the PUCCH is transmitted, based on the subframes designated for each eNB. In a case such as this, but not limited to this case, the WTRU may maintain separate UL timing for each eNB for which the PUCCH may be intended. The WTRU may do one or more of the following:

Maintain one DL timing reference for the PUCCH, which may be based on the DL timing of one of the PCell, the cell on which the WTRU is transmitting PUCCH, or another cell possibly designated to the WTRU via signaling such as RRC signaling.

Maintain separate TA for each eNB, possibly for a designated cell of the eNB, possibly for the cell on which the WTRU may transmit PUCCH when PUCCH is intended for that eNB.

Use only the TA commands received from each eNB to update the TA for that eNB; the WTRU may maintain a TA accumulator for each eNB to accomplish this, $TA_{ENBx}(i)$.

Use the TA value for eNB x in any subframe it may transmit PUCCH intended for eNB x.

In subframe i, when transmitting to eNB x, use the TA value for eNB x which includes TA commands for eNB x received through subframe i−k, where k may be 6.

Use the regular PCell PUSCH TA for the PUCCH TA when transmitting PUCCH intended for the PCell.

Upon receipt of an absolute TA, possibly in response to or as part of a RACH procedure, update the TA value for the corresponding eNB to be the value of the received absolute TA, possibly only for the eNB of the PCell or for the eNB of a cell on which the WTRU can send a RACH.

Autonomously determine an absolute TA for an eNB based on the time difference between a DL cell of that eNB and a reference DL cell such as the PCell and possibly set the TA for that eNB to that absolute TA. This determination may be made in accordance with at least one of the following: in response to a signaled request from an eNB, after the WTRU performs a RACH procedure on another cell such as the PCell, or for the first PUCCH transmission to that eNB after a certain event. This event may be activation of the DL SCell associated with the UL cell on which the PUCCH will be transmitted after configuration or reconfiguration or activation of the SCell after deactivation, possibly after deactivation for some period of time.

In a subframe in which the WTRU may transmit PUCCH intended for one eNB or cell and that eNB or cell is not the same as the eNB or cell on which whose resources the WTRU is transmitting the PUCCH, and if the WTRU has PUSCH resources assigned (for example an UL grant) in that subframe for the eNB or cell on which whose resources the WTRU is transmitting the PUCCH, the WTRU may do one or more of the following:

The WTRU may adjust the timing and/or contents of the PUSCH transmission.

The WTRU may adjust the timing of the PUSCH transmission to align with the PUCCH timing.

The WTRU may drop the PUSCH transmission (i.e., not transmit the PUSCH), possibly only if the UL timing of the PUCCH and the PUSCH differ by more than a threshold.

The remedies described above may be used if the WTRU is unable to transmit PUCCH and PUSCH with different UL timing.

When the WTRU may transmit PUCCH intended for different eNBs or cells on different frequencies and/or resources, for example, resources of different UL cells may be used, the WTRU may determine the TA for each PUCCH separately.

In a case such as this, but not limited to this case, the WTRU may maintain separate UL timing for each cell on which the WTRU may transmit PUCCH, or possibly for each eNB for which there is a cell on which the WTRU may transmit PUCCH.

The WTRU may determine TA for separate PUSCH that may be transmitted to each of multiple eNBs or cells, as depicted in FIGS. 8 and 9. The scenario may be, for example, that the WTRU transmits a separate PUSCH, possibly PUSCH carrying UCI, to each of one or more eNBs or cells. Separation may be by one or more of frequency, resources, and time.

One or more methods and systems described herein for handling timing advance for PUCCH which may be transmitted to, intended for, or received by one or more eNBs or cells may be applied to a PUSCH channel that may be transmitted to, intended for, or received by one or more eNBs or cells.

An eNB may signal, and a WTRU may receive, separate TA commands for PUCCH, in addition to other TA commands, which may still apply to PUSCH and SRS. This may be done by using the R field in the MAC CE to indicate a PUCCH TA command, or by using a unique LCID to identify a separately signaled PUCCH TA command.

There may be a separate TAT for the PUCCH, possibly for each PUCCH if the WTRU may transmit multiple PUCCH, possibly for each cell or eNB for which the WTRU may intend its PUCCH transmission.

The value of timeAlignmentTimer may also be used for the PUCCH TAT, or a separate value may be signaled, possibly for each PUCCH, possibly for each cell or eNB for which the WTRU may intend its PUCCH transmission.

WTRU behavior upon PUCCH TAT expiry may be one or more of the following. The WTRU may cease PUCCH transmissions for the PUCCH or PUCCHs associated with that TAT, possibly except for PUCCH on the PCell. The WTRU may cease PUCCH transmission intended for the cell(s) or eNB(s) associated with the TAT, possibly except for PUCCH on the PCell. The WTRU may send PUCCH to the PCell possibly based only on PCell timing. This may be done only if the regular TAT for the PCell has not also expired or if the WTRU has a PUCCH specific TA, the WTRU may use the regular PCell TA for the PUCCH transmission. The WTRU may send PUCCH to the PCell possibly based only on PCell PUCCH TA requirements. The WTRU may use PUSCH to send UCI. The WTRU may inform eNB via signaling, possibly on a PUSCH, possibly via RRC signaling or a MAC CE that a PUCCH TAT has expired. The eNB may be notified of which PUCCH TAT has expired.

One purpose of power headroom reporting may be to enable the scheduler, which may or may not be part of an eNB, to make intelligent scheduling decisions when allocating UL resources for PUSCH transmission. It may therefore be useful for a scheduler, e.g., one in an eNB, that may allocate PUSCH resources to receive headroom reports and it may not be useful for a scheduler, e.g., one in an eNB, that has no control over PUSCH resource allocation to receive such reports.

In accordance with various embodiments, such as depicted in FIGS. 7, 8 and 9, when PUCCH and/or PUSCH transmission power may be affected by multiple eNBs directly (e.g., by TPC commands) or indirectly (e.g., by the need to share the WTRU power among the transmissions to the different eNBs), the WTRU may send information to one or more eNBs, possibly in the PHR, regarding various effects which may be used by the scheduler(s) for scheduling decisions. Use of both the terms eNB and scheduler in certain embodiments is not intended to imply any limitation of meaning of these terms. Both are non-limiting examples, and each may have one or more of the meanings and/or may be replaced as previously described herein. For example, an eNB or scheduler may be known to the WTRU by a configured set of cells.

One eNB may provide its headroom information received from the WTRU, for example its PHR, to another eNB, possibly via an X2 or X2-like interface, possibly including information on in what subframe the PHR was received or determined in the WTRU, and possibly including scheduling information providing, for example, what UL grants were signaled to the WTRU during the period the WTRU determined the PHR or what the resource allocation, e.g., number of RBs, was for the PHs in the PH report.

In one example, more than one eNB, possibly all eNBs providing UL grants to the WTRU, may exchange PHR and scheduling information. This exchange of power control information may be coordinated in such a way that the information exchanged is relative to a common time period. This method enables each eNB/scheduler to properly determine the effects of scheduling from multiple sites. To facilitate this mechanism, the WTRU may coordinate PHR triggering in such a way that PHRs are determined and sent to each eNB or scheduler at the same time or the PHRs sent to the different eNBs or schedulers correspond to the same time whether or not they are sent or received at the same time. For example, a triggering event associated with a configured set of cells may result in providing PHR for more than one configured set of cells.

Scheduling information may be, for example, in, e.g., reported as, a number of RBs that may, for a given WTRU, be a total number of RBs for all CCs for which a WTRU provided a real PUSCH PH or the number of RBs for each such CC or certain group of CCs. This scheduling information transferred between eNBs may be used by each eNB to better estimate and track MPR effects.

One eNB, for example, the PCell eNB or another eNB, may provide headroom information, for example, its PHR, for example for a certain WTRU or WTRUs that it has possibly adjusted or reformatted, to one or more other eNBs, such as the MeNB, possibly via an X2 or X2-like interface, possibly including information on in what subframe the PHR was received or determined in the WTRU, possibly including scheduling information. Example adjustments may include scaling the PH, possibly to indicate that a WTRU has less power available, which may result in a eNB scheduling less for that WTRU.

One eNB, such as the MeNB, may provide headroom information that it received from one or more WTRUs or eNBs, which it has possibly adjusted or reformatted, to one or more other eNBs, possibly via an X2 or X2-like interface, possibly including information on the subframe in which the PHR was received or determined in the WTRU, and possibly including scheduling information. Example adjustments may include scaling the PH, possibly to indicate a WTRU has less power available, which may result in a eNB scheduling less for that WTRU.

One eNB, for example, the PCell eNB or the MeNB, may request from one or more other eNBs, for example, over an X2 or X2-like interface, UL scheduling attributes, for example, for a reporting time or over a reporting interval in order to properly interpret PHR information received from the WTRU.

Information and information exchange described herein as being part of PH and PHR may be part of any other information elements, messages, signaling, and procedures and would still be within the scope of the present disclosure.

The WTRU may report PH simultaneously, e.g., in a PH report (PHR), for CCs or cells such as activated CCs or cells (e.g., all activated CCs or cells that may have configured UL). The WTRU may instead, or in addition, provide a PHR for CCs or cells (such as all activated CCs or cells that may have configured UL) assigned to a given eNB or scheduler or belonging to a configured set of cells. The WTRU may include in a PHR at least one of an indication of the applicable eNB, scheduler, or configured set of cells, for each CC or cell or each group of CCs or cells or for the report itself. The WTRU may know which CCs or cells are assigned to a given eNB or scheduler by a configured set of CCs or cells that correspond to a particular eNB or scheduler. The simultaneous PHR may be separate PHRs to each eNB or scheduler where each PHR either includes just the set of cells associated with that eNB or scheduler, or all sets of configured cells corresponding to all active eNBs or schedulers. The WTRU may provide PH and PH reports as described herein for eNBs for one or more configured sets of cells with no knowledge of or need for association of a set of configured cells with an eNB or scheduler.

The WTRU may include in a PHR at least one of an indication of the applicable eNB or scheduler for each CC or each group of CCs or for the report itself. This indication may be a unique identifier associated with the particular set of configured CCs or cells.

For the case of separate maximum configured output power per set of cells or set of configured cells, e.g., all cells belonging to a given eNB, the WTRU may include in a PHR the value of said maximum configured output power, possibly for each corresponding cell, each set of configured cells or eNBs or schedulers for which PH is included in the report. The WTRU may include an indication in the PHR as to whether scaling was applied, e.g., for the subframe corresponding to the PHR, for an eNB or for the WTRU as whole, which may be for all eNBs or schedulers.

The WTRU may include in a PHR a power headroom with respect to the maximum configured output power per set of cells or configured set of cells, e.g., belonging to an eNB, for one or more such sets of cells. The PH for a set of cells or eNB may be computed or otherwise determined, e.g., by the WRU, as the difference between the sum of the computed powers for all the channels, e.g., all the PUSCH and PUCCH channels, to be transmitted, for example in a certain subframe, to the cells belonging to the set of cells or eNB and the maximum configured output power for the set of cells or eNB. The eNB may also or instead derive this headroom from other contents of the PHR such as the PH values for the cells, the Pcmax,c values, and the maximum configured output power for the set of cells or eNB.

The WTRU may have a separate PHR prohibit timer for each eNB or scheduler, thus allowing a significant path loss change in a CC or cell of one eNB or scheduler to not prohibit the triggering of PHR due to significant path loss change in a cell associated with another eNB or scheduler. The WTRU may know the eNB or scheduler by a configured set of cells. For example, the WTRU may be configured with multiple sets of CCs or cells, each of which may correspond to a particular eNB or scheduler. Therefore, even though a prohibit timer associated with a eNB or scheduler is running PHR may be reported for these cells if a PH trigger occurs associated with another eNB or scheduler. The transmission of this PHR may only reset the prohibit timer associated with the eNB or scheduler for which the trigger occurred.

A WTRU may include scheduling information in a PH report, for example for each CC or cell, or configured set of CCs or cells that may belong to the same eNB or scheduler, for which the WTRU may have a PUSCH transmission in the subframe in which it transmits the PH report. Since scheduling information is intended to inform eNBs or schedulers of what other eNBs or schedulers have scheduled at the time of PH determination, it may be limited to scheduling information not associated with the eNB or scheduler for which the PHR is transmitted. For a CC or cell, the scheduling information may be the size of the UL grant or SPS allocation, for example, the number of RBs, or an indication representing an approximate number of RBs (e.g., an indication corresponding to the nearest one of a list of RB sizes such as 6, 15, 25, 50 75, 100, to the actual grant or allocation), so a smaller number of bits may be used to represent the size of the allocation in the transmitted PH report. Scheduling information corresponding to a set of configured CCs or cells may be the combined grants and allocations over all the CCs or cells in the set of configured CCs or cells, which may be the total number of RBs over all the CCs or cells in the set of configured CCs or cells. This may enable the eNB(s) or scheduler(s) receiving the report to have the information needed to understand what the WTRU power situation may be and what transmission it may be based upon.

A WTRU may transmit a PH report including one or more Type 1 PH and/or Type 2 PH in a given report.

A WTRU may transmit a PHR containing PH and related parameters (e.g., at least one of Pcmax,c, real/virtual indication (e.g., V-bit), P-MPR domination indication (e.g., P-bit), activated CC indication (or indication of the CCs for which PH is included in the PHR), corresponding eNB indication, scheduling information, scaling indication(s) among others) for CCs corresponding to more than one eNB to, or intended for reception by, an eNB.

If there is a WTRU configured maximum output power per eNB, the WTRU may include that in the PHR for each eNB for which a PH is being reported for at least one CC corresponding to that eNB.

The WTRU may include an overall WTRU configured maximum output power, Pcmax in a PHR.

A WTRU may transmit a PH report to or intended for reception by a certain eNB including the PH and related parameters (such as those described previously) corresponding to the CCs or cells (e.g., only the CCs or cells) which correspond to at least one of the certain eNB, another single eNB, or a group of eNBs which may be all the eNBs to which the WTRU may transmit or may be configured to transmit PUSCH and/or PUCCH, or a subset of those eNBs. The certain eNB may be or include a specific eNB such as the PCell eNB or the MeNB. The certain eNB may be any one of the eNBs, which may schedule or allocate PUSCH and/or PUCCH resources to that WTRU. The WTRU may transmit a PH report to one or more such certain eNBs simultaneously (e.g., in the same subframe) or at different times (e.g., different subframes).

In the case of power headroom for one PUCCH that may be received or that may be intended to be received by multiple eNBs or cells, a Type 2 power headroom may take into account PUSCH and PUCCH power for the subframe in which the PHR may be or is to be transmitted. The WTRU may report, possibly as part of the PHR, for a real PUCCH transmission, for transmission to what eNB or cell or eNBs or cells the PUCCH transmit power used in the headroom calculation was based upon.

As an example, the report may indicate the specific eNB(s) or cells on which the power was based. For example, if the PUCCH may be or is transmitted on the resources of the PCell, but the PUCCH power may be or may have been driven by the requirements to reach another eNB, that other eNB may be indicated.

As another example, the report may indicate, possibly with a bit, whether or not the power was based on the power needed for the cell on which the PUCCH was transmitted or for another eNB. For example, if the PUCCH is transmitted on the resources of the PCell, there may be an indication, possibly a bit, indicating whether the power was driven by the requirements for the PCell or the requirements to reach another eNB. The WTRU may report, possibly as part of the PHR, for which eNBs or cells the PUCCH was intended when computing the PH.

As another example, the report may indicate for which eNBs or cells the PUCCH was intended as a list of eNBs or cells or possibly one of a set of scenarios, such as: only PCell, one or more eNBs or cells and not PCell, and/or PCell and one or more additional eNBs or cells.

The applicable scenario may be indicated by the WTRU in one or two of the two reserved bits of the Type 2 Pcmax,c octet of the extended PHR MAC CE, for example. In one embodiment, the WTRU may include in the PHR, the power or the headroom for the PUCCH for each eNB that the WTRU may transmit to, possibly with an indication of which power or headroom is currently being used. For example, if the WTRU is transmitting PUCCH on the resources of the PCell and another eNB may receive the PUCCH, possibly even if the current transmission does not have information intended for that eNB, the WTRU may provide two headroom values: one calculated based on the requirements for the PCell, and another calculated based on the requirements of the other eNB, for example, by using the path loss and TPC factor for that eNB. The WTRU may also indicate which of the headroom values applies in that report. For the case of virtual PUCCH in the report, both versions of the PH may be virtual.

In some embodiments, a PUCCH may be received or may be intended to be received by one eNB or cell at a time. A WTRU may provide Type 1 PH for CCs such as activated CCs (e.g., all activated CCs which may have configured UL). A WTRU may provide Type 2 PH (or another PH such as Type 3 described herein) for any CC such as an activated CC, e.g., an activated CC with configured UL, that may transmit PUCCH at any time. A WTRU may provide, e.g., may only provide, Type 2 PH (or another PH such as Type 3) in a certain PHR for a CC on which PUCCH may be transmitted in the subframe in which the WTRU transmits the certain PHR. The WTRU may indicate in the PHR for which CC it is reporting Type 2 (or other) PH. Type 2 PH may only be provided if simultaneous PUSCH plus PUCCH may be configured for the WTRU and may be supported by the WTRU.

If there is a WTRU configured maximum output power per eNB, the WTRU may include that in the PHR for each eNB, which may have activated CCs or activated CCs with configured UL.

One or more of the methods and systems described for power headroom for one PUCCH that may be or may be intended to be received by multiple eNBs or cells may be applied to the case of one PUSCH that may be or may be intended to be received by multiple eNBs or cells. The applicable scenario may be indicated by the WTRU in one or two of the two reserved bits of the Type 1 Pcmax,c octet of the extended PHR MAC CE.

For the case of simultaneous PUCCH and PUSCH on SCells, a WTRU may include a Type 2 PH in the PHR for SCells configured for such simultaneous transmission. For the case of PUCCH-only transmitted to SCells, a new type of PHR, herein denoted as Type 3, may be transmitted by the WTRU for SCells. For the case of PUCCH transmitted, Type 3 PHR may be defined as $$PH_{type3}(i) = P_{CMAX,c}(i) - 10 \log_{10}(P_{0\_PUCCH,c} + PL_c + h(n_{CQI,c}, n_{HARQ,c}, n_{SR,c}) + \Delta_{F\_PUCCH,c}(F) + \Delta_{TxD,c}(F') + g_c(i))$$

For the case of PUCCH not transmitted, e.g., virtual transmission, Type 3 PHR may be defined as $$PH_{type3}(i) = P_{CMAX,c}(i) - 10 \log_{10}(P_{0\_PUCCH,c} + PL_c + g_c(i))$$

where
$P_{0\_PUCCH,c}$, $\Delta_{F\_PUCCH,c}(F)$, $\Delta_{TxD,c}(F')$, $g_c(i)$ may be CC-specific values similar to or equivalent to the R10 parameters, and
$n_{CQI,c}$, $n_{HARQ,c}$, $n_{SR,c}(i)$ may be the number of CQI, HARQ and SR bits being signaled in the specific CC.

The WTRU may include Pcmax,c with Type 3 PHR, for example, for the case of real PUCCH transmission, in the manner of Release 10.

In some embodiments in which a WTRU may transmit separate PUSCH channels that may be received by separate eNBs and those eNBs may schedule, e.g., by grant or allocation such as SPS allocation those PUSCHs, multiple eNBs (e.g., all of the eNBs, or all of the eNBs which may schedule PUSCH for that WTRU, or all the eNBs that may schedule PUSCH and/or allocate PUCCH resources for that WTRU) may need to have some understanding of the transmissions to the other eNBs to avoid over scheduling and under-scheduling. One or more of the embodiments previously or subsequently described herein for PH and/or PH reporting may be applied in this case.

The WTRU may send PHR to each eNB directly, for example, since each may have resources for PUSCH transmission. The WTRU may send PHR, for example in a MAC-CE, to each eNB that may schedule UL PUSCH and/or may allocate PUCCH resources. The WTRU may send to each eNB PH (e.g., one or more of Type1, Type2, and Type 3) and associated bits and parameters for the CCs associated with that eNB or for CCs associated with another one or more eNBs.

The PHR may contain PH (e.g., one or more of Type1, Type2, and Type 3) and related bits and parameters that may be at least one of CC-specific, WTRU-specific, or eNB-specific. For CC-specific bits and parameters, the WTRU may include such bits and/or parameters for each CC for which PH or real PH is included in the PHR. Examples of CC-specific bits and parameters include real/virtual indication (e.g., V-bit), P-MPR domination indication (e.g., P-bit), Pcmax,c, and scheduling information. Examples of WTRU-specific bits and parameters include Pcmax, indication of activated CCs or CCs for which PH may be included in the report, scheduling information, scaling information, and indication of eNBs for which PH (e.g., PH for at least one of its associated CCs) may be included in the PHR. Examples of eNB-specific bits and parameters include scheduling information, scaling information, WTRU configured maximum output power for an eNB, which may be the eNB which may (or may be intended to) receive the PHR, for example in a MAC-CE, or for an eNB which may be an eNB for which the PHR includes a PH, a real PH, or a real PUSCH PH for at least one of its associated CCs.

Bits, parameters, and values may be used interchangeably herein and still be consistent with this disclosure.

The WTRU may provide PHR to one or more eNBs, such as the PCell eNB or MeNB, for cells controlled by or associated with other eNBs which may enable the eNB to detect available/used power for cells of other eNBs.

In some embodiments, the WTRU may trigger PHR based on a difference, such as a big difference, or a change, such as a big change, in the difference between the PUCCH power needed for the cell on which the PUCCH is being transmitted, e.g., the PCell, and the PUCCH power needed for reception intended for, or for reception by, another eNB. A big difference or big change may mean a difference or change greater than a certain threshold. The WTRU may trigger (e.g., only trigger) the PHR if the WTRU power for transmission of PUCCH is based on requirements of an eNB or cell other than the one on which the WTRU is transmitting the PUCCH. This may be applicable to the case of one PUCCH on resources of one cell, possibly to be received by multiple eNBs or cells or the case in which PUCCH transmission may switch from one cell to another which may belong to another eNB.

In some embodiments, the WTRU may trigger PHR based on a big (e.g., greater than a certain threshold) difference or a big (e.g., greater than a certain threshold) change in the difference between the PUSCH power needed for the cell on which the PUSCH is being transmitted, e.g., the PCell, and the PUSCH power needed for reception intended for, or for reception by, another eNB. The WTRU may trigger, e.g, may only trigger, the PHR if the WTRU power for transmission of PUSCH is based on requirements of an eNB or cell other than the one on which the WTRU is transmitting the PUSCH. This may be applicable to the case of one PUSCH on resources of one cell, possibly to be received by multiple eNBs or cells.

In some embodiments, the WTRU may trigger PHR based on a change on which eNB or cell's requirements the PUCCH or PUSCH power is based. The WTRU may trigger PHR only if it changes from or to the eNB or cell on whose resources the PUCCH or PUSCH is being transmitted, possibly only if the PUCCH or PUSCH power changes by more than a threshold.

As described above, in a scenario in which a WTRU transmits separate PUSCH channels to each of multiple eNBs and those eNBs may schedule, e.g., by grant or allocation such as SRS allocation, those PUSCHs, the WTRU may send PHR, for example in a MAC-CE, to each eNB that may schedule UL PUSCH. In some embodiments, each eNB or scheduler may have complete PH information. Even though a trigger may be associated with a set of configured cells corresponding to a particular eNB or scheduler, the report or reports may include PH information associated with other eNBs or schedulers. For example, a PH report may include information for all configured sets of cells corresponding to all eNBs or schedulers. Further, a trigger for a PH report associated with one set of configured cells associated with a particular eNB or scheduler may also trigger PH reports to other eNBs or schedulers.

In some embodiments, a WTRU may maintain separate triggers and possibly prohibit timers for the eNBs or cells. A WTRU may trigger sending PHR to an eNB, eNB x, according to at least one of the following. A WTRU may trigger sending PHR when a trigger condition is met, for example, for path loss change or P-MPR change or activation, for a cell of eNB x, and eNB x has a cell with UL resources for new transmission. In this case, PHR may be triggered to send PHR to eNB x. The trigger associated with a cell of one eNB x may also result in sending PHR to other or all eNBs. A WTRU may trigger sending PHR when comparing whether thresholds have been crossed or other criteria have been met that would warrant triggering PHR. The starting point for the comparison for a trigger corresponding to a cell associated with eNB x may be relative to when the last PHR, e.g., the last PHR that included PH for that cell, was sent to eNB x or when the last real PHR, e.g., the last PHR that included a real PH for that cell, for example in the case of P-MPR trigger, was sent to eNB x. A WTRU may trigger sending PHR when a trigger condition is met for any cell, for example, for path loss change or P-MPR change or activation, and there is any cell with UL resources for new transmission. In this case, PHR may be triggered to send PHR to any eNB which has a cell with UL resources for new transmission. For an eNB that does not have UL resources for new transmission, the PHR may be triggered in a subsequent, such as the next, subframe (or TTI) in which that eNB does have UL resources for new transmission. For these cases, a cell corresponding to eNB x may be known to the WTRU by a configured set of cells.

In some embodiments, a WTRU may send, e.g., only send, PHR to one eNB, for example the PCell eNB, the MeNB, or other designated eNB, which may change from time to time. A WTRU may trigger sending PHR to an eNB, eNB x, according to at least one of the following. A WTRU may trigger sending PHR when a trigger condition is met, for example for path loss change or P-MPR change or activation, for a cell, such as any activated cell with configured UL, and eNB x has a cell with UL resources for new transmission. In this scenario, PHR may be triggered to send PHR to eNB x. A WTRU may trigger sending PHR when comparing whether thresholds have been crossed or other criteria have been met that would warrant triggering PHR. The starting point for the comparison may be when the last PHR was sent to eNB x or when the last real PHR, for example in the case of P-MPR trigger, was sent to eNB x.

Other criteria, for example, per R10 requirements, may need to be met in order to trigger PHR. These criteria may be included in the trigger condition being met in some embodiments.

The MeNB may receive PHR from the WTRU. For each CC, the MeNB may provide available WTRU transmit power, possibly PHR, possibly after adjustment, to the eNB controlling the CC, possibly over an X2 or X2-like interface to that eNB. Example adjustments may include scaling the PH, possibly to indicate a WTRU has less power available, which may result in a eNB scheduling less for that WTRU.

Figure 11:
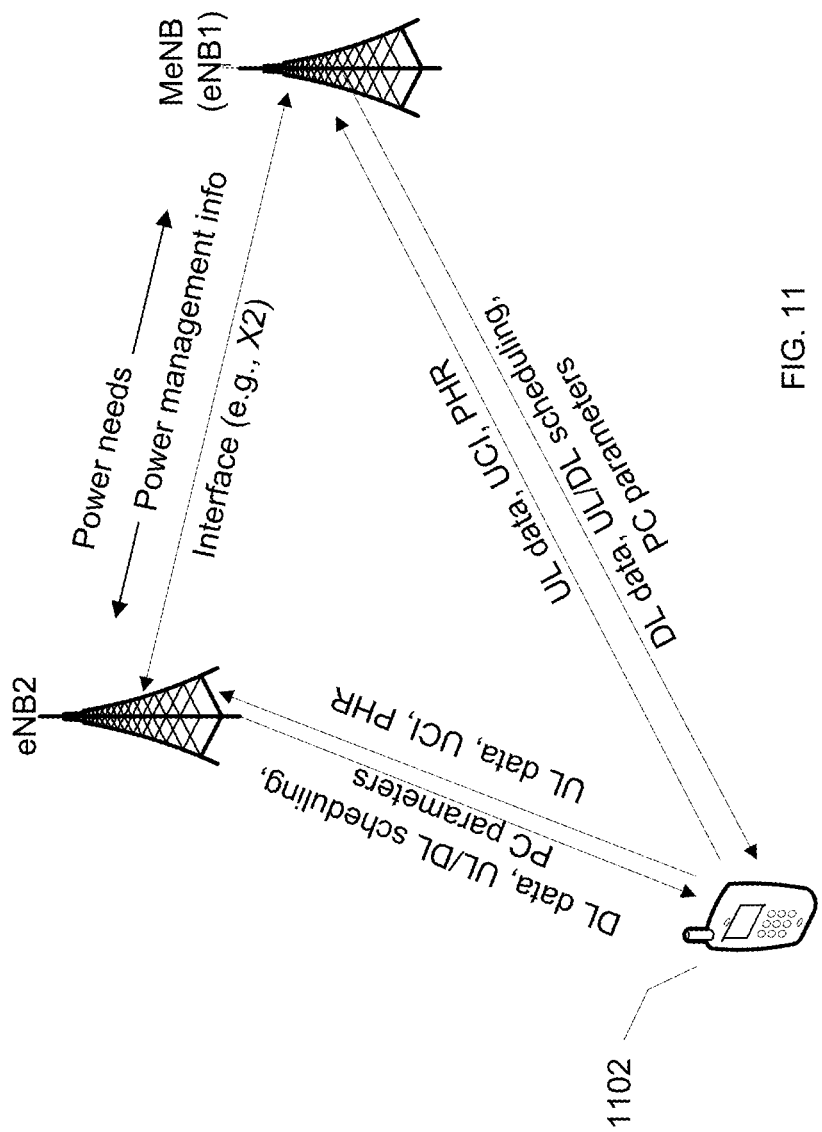
FIG. 11 illustrates a WTRU communicating with one or more cells associated with each of two eNBs and the exchange of power management information among them.

FIG. 11 provides an example of a multi-eNB scenario in which a WTRU 1102 may communicate with one or more cells associated with each of two eNBs. These eNBs may be or may include schedulers that may independently schedule the WTRU for UL transmissions, which may result in the WTRU transmitting to the two eNBs simultaneously. One of the eNBs may be a MeNB that may distribute the power available for the WTRU's UL transmissions to each of the two eNBs.

In this example, eNB2 may inform the MeNB of its power needs for the WTRU and the MeNB may provide it with power management information such as the maximum power the WTRU may transmit to eNB2 or the maximum PUSCH grant size across the cells of eNB2.

MeNB may receive PH reports from the WTRU, which may provide PH and associated parameters for its transmission to eNB1 only or to both eNB1 and eNB2. eNB2 may also receive PH reports from the WTRU which may provide PH and associated parameters for its transmission to eNB2 only or to both eNB1 and eNB2. The parameters associated with PH may include any of those previously described herein such as Pcmax,c, real/virtual indication, P-MPR domination indication, activated CC indication, scheduling information, among others.

MeNB may provide PC parameters, such as the max power per CC or per eNB to the WTRU for eNB1 only or for both eNB1 and eNB2. eNB2 may, in addition or instead, provide the WTRU with some or all of the PC parameters related to transmission to eNB2.

Each eNB may provide the WTRU with scheduling (e.g., by grant or allocation) for UL transmission to that eNB.

In this example, UCI that is intended for each eNB may be transmitted by the WTRU on UL resources of that eNB. In another example, the WTRU may transmit all the UCI to one eNB, such as the MeNB, and that eNB may relay the UCI to the other eNB.

In another example, MeNB may be a separate entity from eNB1 and eNB2. eNB1 and/or eNB2 may provide PH reports and/or power needs to the MeNB and the MeNB may provide power management information to each of the eNBs.

In various methods and systems described herein, there may be times when a WTRU may determine the transmission power of a channel that may be or may be intended to be received by multiple eNBs based on the requirements of a particular eNB, eNB x, where eNB x may be the eNB requiring the most power for successful reception. This eNB may be referred to as the eNB driving the power or the driving eNB. In some embodiments, the WTRU may identify to one or more eNBs which eNB is driving the power. The WTRU may accomplish this via RRC, MAC, e.g., in PHR, or physical layer signaling.

For example, when a WTRU may choose to apply TPC from eNB x to drive transmission power, the WTRU may identify the chosen (e.g., driving) eNB x to one or more eNB's by RRC, MAC, e.g., in PHR, or physical layer signaling.

In various embodiments, an eNB, for example the PCell eNB or MeNB that may receive this information may provide it to one or more other eNBs, possibly via an X2 or X2-like interface.

In various embodiments, the WTRU may identify the driving eNB to one eNB such as the PCell eNB or the MeNB, and that eNB may provide the information to one or more other eNBs.

This signaling may be useful to the non-driving eNBs to enable them to be aware that they may not or do not have control of the power and/or to know which eNB is or may be in control. This may enable eNBs to control interference in their own cells. Interference may be controlled by disallowing eNBs driving the power too high from continuing to do so, for example, by deactivating those cells which may require high power such as power greater than a threshold or power greater than some threshold more than that needed by one or more other cells or eNBs.

A WTRU may be requested to stop accumulating TPC commands from certain eNBs. This request may be via RRC, MAC, or physical layer signaling. In response, the WTRU may ignore TPC commands from the designated eNB or eNBs.

The invention claimed is:

1. A method comprising:
   a wireless transmit/receive unit (WTRU) establishing connection with at least a first serving cell of a first set of cells associated with a first eNodeB (eNB) and at least a second serving cell of a second set of cells associated with a second eNB, wherein the WTRU is simultaneously connected to at least the first serving cell of the first set of cells associated with a first eNB and at least the second serving cell of the second set of cells associated with the second eNB;
   reporting power headroom associated with at least the first serving cell of the first set of cells associated with the first eNB and at least the second serving cell of the second set of cells associated with the second eNB, wherein the power headroom reporting comprises
      determining a first set of one or more power headrooms associated with at least the first serving cell of the first set of cells associated with the first eNB, and
      determining a second set of one or more power headrooms associated with at least the second serving cell of the second set of cells associated with the second eNB,
      sending the first set of one or more power headrooms and the second set of one or more power headrooms to the first eNB; and
      determining a first set of one or more updated power headrooms associated with at least the first serving cell of the first set of cells associated with the first eNB, and
      determining a second set of one or more updated power headrooms associated with at least the second serving cell of the second set of cells associated with the second eNB, and
      sending the first set of one or more updated power headrooms and the second set of one or more updated power headrooms to the second eNB.

2. The method of claim 1, wherein the first set of one or more power headrooms and the second set of one or more power headrooms are sent simultaneously to the first eNB and the first set of one or more updated power headrooms and the second set of one or more updated power headrooms are sent simultaneously to the second eNB.

3. The method of claim 1, wherein determining each of the first set of one or more power headrooms, the first set of one or more updated power headrooms, the second set of one or more power headrooms, or the second set of one or more updated power headrooms, is based on a respective triggering procedure.

4. The method of claim 3, wherein each of the respective triggering procedures corresponds to a change related to a cell of the set of cells associated with the respective eNB.

5. The method of claim 3, wherein sending the second set of one or more power headrooms to the first eNB is based on the triggering procedure of the second set of one or more power headrooms.

6. The method of claim 1, wherein sending the second set of one or more power headrooms to the first eNB further comprises sending scheduling information for the second set of cells associated with the second eNB.

7. The method of claim 1, wherein sending the first set of one or more updated power headrooms to the second eNB further comprises sending scheduling information for the first set of cells associated with the first eNB.

8. The method of claim 1, wherein reporting of the first set of one or more power headrooms does not prohibit reporting of the second set of one or more power headrooms.

9. A wireless transmit/receive unit (WTRU) comprising:
   a processor configured to:
      establish connection with at least a first serving cell of a first set of cells associated with a first eNodeB (eNB) and at least a second serving cell of a second set of cells associated with a second eNB, wherein the WTRU is simultaneously connected to at least the first serving cell of the first set of cells associated with a first eNB and at least the second serving cell of the second set of cells associated with the second eNB;
      report power headroom a associated with at least the first serving cell of the first set of cells associated with the first eNB and at least the second serving cell of the second set of cells associated with the second eNB,
      determine a first set of one or more power headrooms associated with at least the first serving cell of the first set of cells associated with the first eNB;
      determine a second set of one or more power headrooms associated with at least the second serving cell of the second set of cells associated with the second eNB;
   a transceiver configured to send the first set of one or more power headrooms and the second set of one or more power headrooms to the first eNB;
   the processor configured to determine a first set of one or more updated power headrooms associated with at least the first serving cell of the first set of cells associated with the first eNB;
   the processor configured to determine a second set of one or more updated power headrooms associated with at least the second serving cell of the second set of cells associated with the second eNB; and
   the transceiver configured to send the first set of one or more updated power headrooms and the second set of one or more updated power headrooms to the second eNB.

10. The WTRU of claim 9, wherein the first set of one or more power headrooms and the second set of one or more power headrooms are sent simultaneously the first eNB and the first set of one or more updated power headrooms and the second set of one or more updated power headrooms are sent simultaneously to the second eNB.

11. The WTRU of claim 9, wherein the processor is further configured to determine each of the first set of one or more power headrooms, the first set of one or more updated power headrooms, the second set of one or more power headrooms, or the second set of one or more updated power headrooms, based on a respective triggering procedure.

12. The WTRU of claim 11, wherein each of the respective triggering procedures corresponds to a change related to a cell of the set of cells associated with the respective eNB.

13. The WTRU of claim 11, wherein sending the second set of one or more power headrooms to the first eNB is based on the triggering procedure of the second set of one or more power headrooms.

14. The WTRU of claim 9, wherein sending the second set of one or more power headrooms to the first eNB further comprises sending scheduling information for the second set of cells associated with the second eNB.

15. The WTRU of claim 9, wherein sending the first set of one or more updated power headrooms to the second eNB further comprises sending scheduling information for the first set of cells associated with the first eNB.

16. The method of claim 4, wherein the change is one of a path loss change, a power management maximum power reduction (P-MPR) change or an activation of new cell associated with the first set of cells or the second set of cells.

17. The WTRU of claim 12, wherein the change is one of a path loss change, a power management maximum power reduction (P-MPR) change or an activation of new cell associated with the first set of cells or the second set of cells.

* * * * *